United States Patent
Walling et al.

(10) Patent No.: US 11,562,374 B2
(45) Date of Patent: Jan. 24, 2023

(54) RIDESHARE VERIFICATION

(71) Applicant: VERI RIDESHARE L.L.C., Brandon, FL (US)

(72) Inventors: Jeffrey Walling, Brandon, FL (US); Matthew James, Brandon, FL (US); Matthew King, Brandon, FL (US); Scott Nordhaus, Brandon, FL (US)

(73) Assignee: VERI RIDESHARE L.L.C., Brandon, FL (US)

( * ) Notice: Subject to any disclaimer, the term of this patent is extended or adjusted under 35 U.S.C. 154(b) by 4 days.

(21) Appl. No.: 17/012,905

(22) Filed: Sep. 4, 2020

(65) Prior Publication Data

US 2021/0073825 A1 Mar. 11, 2021

Related U.S. Application Data

(60) Provisional application No. 62/896,227, filed on Sep. 5, 2019.

(51) Int. Cl.
*G06Q 30/00* (2012.01)
*G06Q 50/30* (2012.01)
(Continued)

(52) U.S. Cl.
CPC .......... *G06Q 30/0185* (2013.01); *G01S 19/01* (2013.01); *G06Q 10/10* (2013.01);
(Continued)

(58) Field of Classification Search
CPC ............... G06Q 30/0185; G06Q 10/10; G06Q 30/0266; G06Q 30/0269; G06Q 50/30;
(Continued)

(56) References Cited

U.S. PATENT DOCUMENTS 8,086,400 B2 12/2011 Huang et al.
8,630,897 B1 1/2014 Gomez et al.
(Continued)

FOREIGN PATENT DOCUMENTS

AU 2019236737 A1 10/2019
AU 2020100006 A4 2/2020
(Continued)

OTHER PUBLICATIONS

Neil Patel, When it comes to moving people and making deliveries, few companies are more widespread and more widely-recognized than Uber, 2017 (Year: 2017).*

(Continued)

*Primary Examiner* — Tarek Elchanti
(74) *Attorney, Agent, or Firm* — Mueting Raasch Group

(57) ABSTRACT

Illustrative methods and systems may determine whether a rideshare is verified based on received rideshare data. A verification code may be assigned to a rideshare trip. The verification code may be provided to a rider of the rideshare trip. The verification code may be received by a vehicle device assigned to the rideshare trip via user input or communication from the rider device. Whether the rider has entered the correct vehicle for the rideshare trip may be verified based on the verification code assigned to the rideshare trip and the verification code received by the rideshare vehicle.

19 Claims, 19 Drawing Sheets

(51) Int. Cl.
*G06Q 10/10* (2012.01)
*G06Q 30/02* (2012.01)
*H04L 9/40* (2022.01)
*H04L 67/12* (2022.01)
*G01S 19/01* (2010.01)

(52) U.S. Cl.
CPC ..... *G06Q 30/0266* (2013.01); *G06Q 30/0269* (2013.01); *G06Q 50/30* (2013.01); *H04L 63/083* (2013.01); *H04L 67/12* (2013.01); *G06Q 2240/00* (2013.01)

(58) Field of Classification Search
CPC ..... G06Q 2240/00; G01S 19/01; G01S 11/02; G01S 11/14; H04L 63/083; H04L 67/12; H04L 67/18
USPC .............................................. 705/13; 701/537
See application file for complete search history.

(56) References Cited

U.S. PATENT DOCUMENTS

| | | | |
|---|---|---|---|
| 9,648,075 B1* | 5/2017 | Kalinke | H04L 67/02 |
| 9,663,067 B2 | 5/2017 | Penilla | |
| 10,223,719 B2 | 3/2019 | Schoeffler | |
| 10,553,113 B2 | 2/2020 | Nangeroni et al. | |
| 2011/0060600 A1 | 3/2011 | Fox et al. | |
| 2015/0204684 A1* | 7/2015 | Rostamian | G06Q 10/101 701/537 |
| 2017/0316533 A1 | 11/2017 | Goldman-Shenhar et al. | |
| 2019/0114638 A1* | 4/2019 | Flores | G06Q 10/02 |
| 2019/0172111 A1 | 6/2019 | Schoeffler | |
| 2019/0297091 A1 | 9/2019 | Kirkham et al. | |
| 2019/0342096 A1 | 11/2019 | Starosielsky et al. | |
| 2020/0065722 A1 | 2/2020 | Smith | |
| 2020/0074849 A1 | 3/2020 | Demisse et al. | |
| 2020/0082718 A1 | 3/2020 | O'Sullivan | |
| 2020/0294174 A1* | 9/2020 | Callahan | G01S 19/39 |

FOREIGN PATENT DOCUMENTS

| | | | |
|---|---|---|---|
| JP | 2004527677 A * | 9/2004 | |
| JP | 2004527677 A * | 9/2004 | |
| OA | WO 2015/127095 A1 | 8/2015 | |
| WO | WO 2015/005948 A1 | 1/2015 | |

OTHER PUBLICATIONS

Kirsten Korosec, "Uber launches PIN feature to cut wait times at US airports, starting in Portland", 2019 (Year: 2019).*
Lilly Kenyon, Uber's New PIN Pickup Feature: How does it work?, 2019 (Year: 2019).*
O'Brien, "Want an Uber? You may have to send a masked selfie first" Sep. 1, 2020, *CNN Business*, online: https://www.cnn.com/2020/09/01/tech/uber-rider-mask-selfie/index.html.
PCT International Search Report and Written Opinion dated Jan. 15, 2021 for PCT Application No. IB2020/059229, filed Oct. 1, 2020, 14 pages.
International Preliminary Report on Patentability for PCT/IB2020/059229 dated Mar. 8, 2022, 8 pages.

* cited by examiner

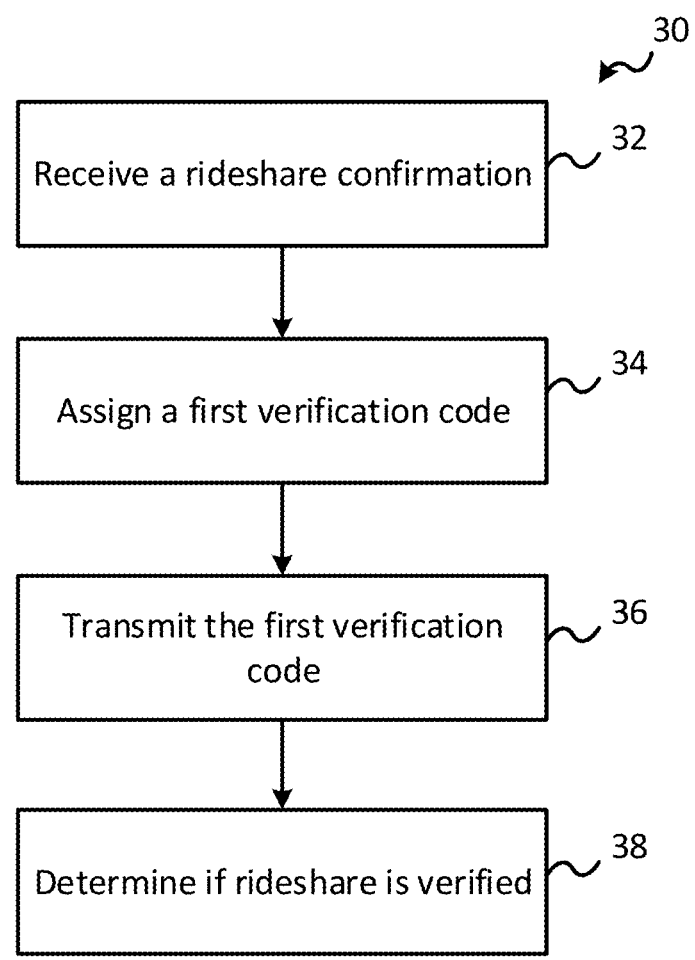

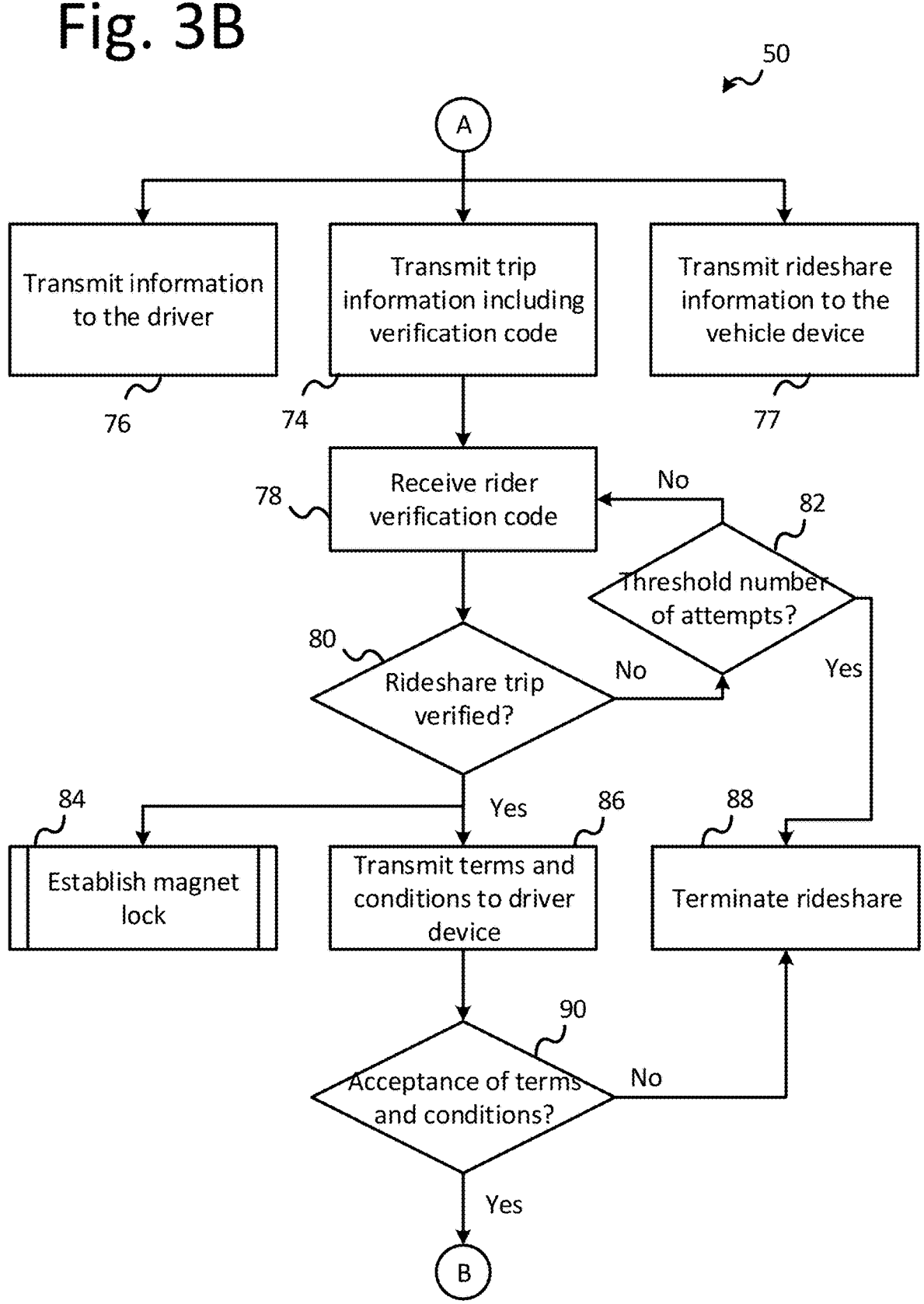

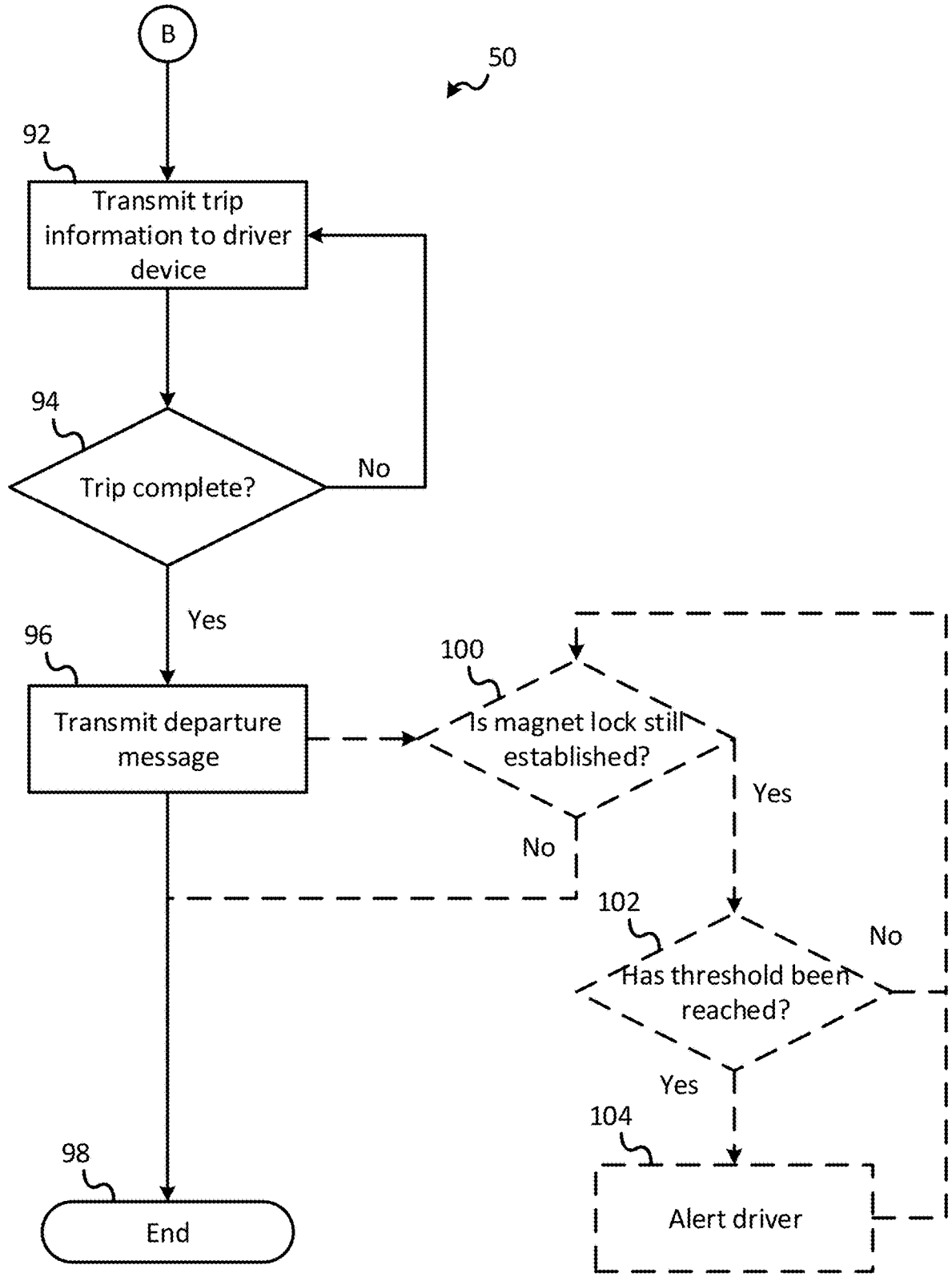

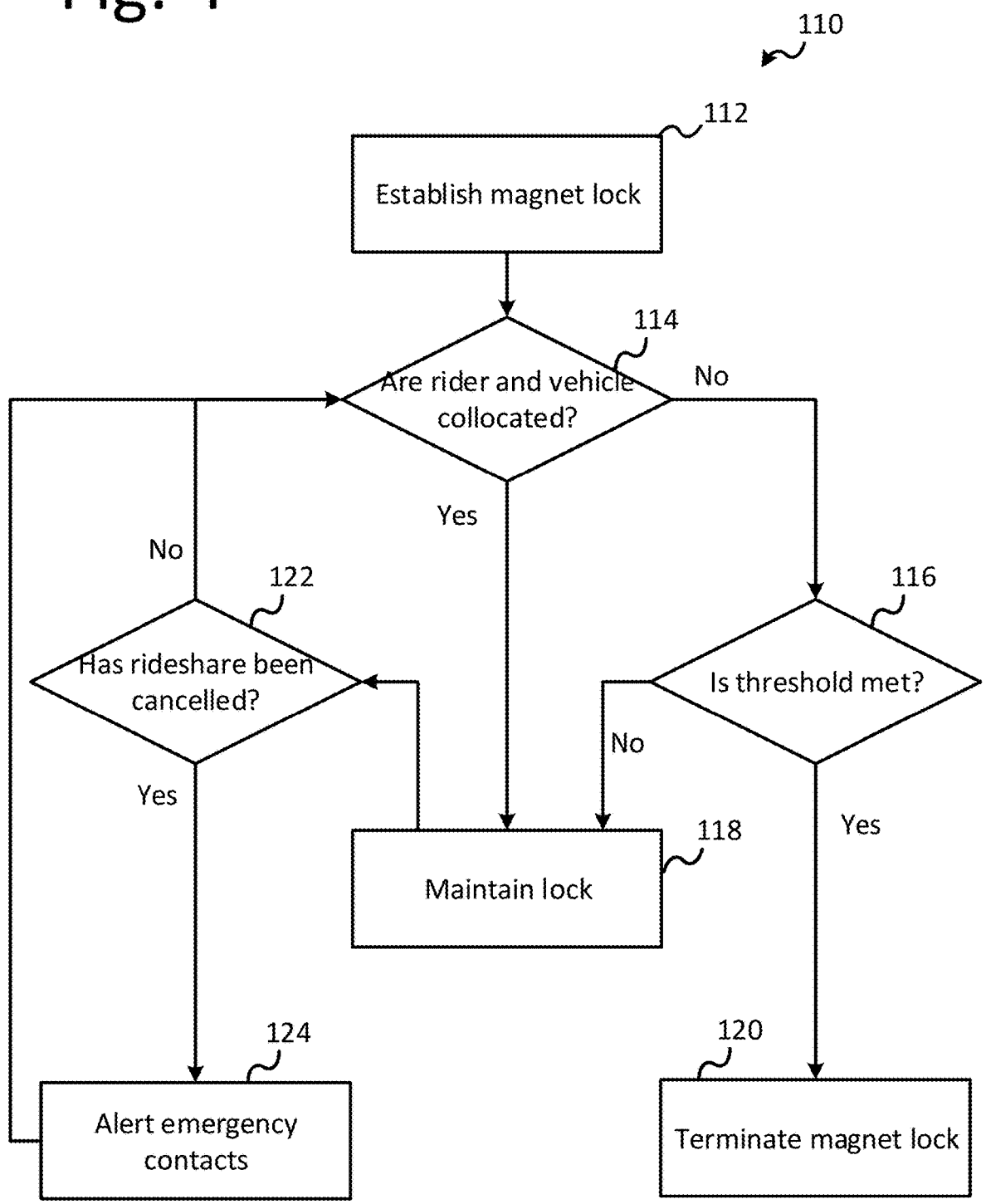

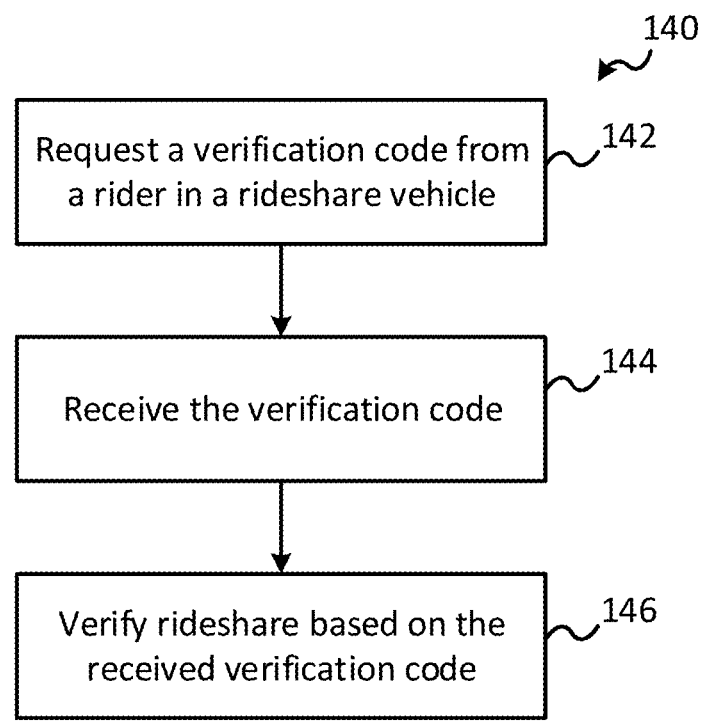

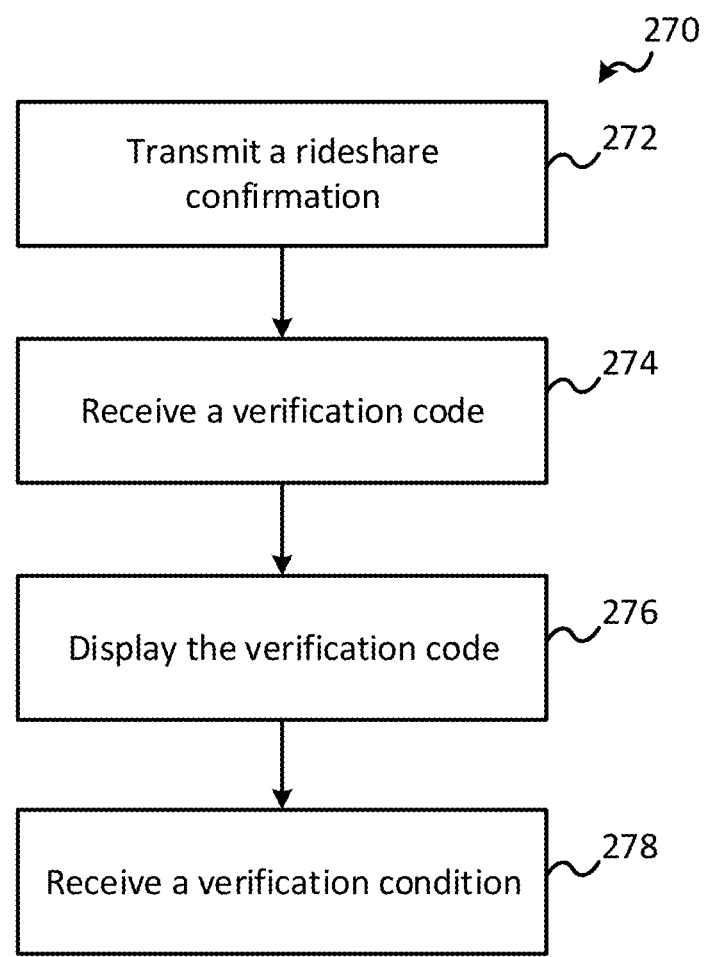

RIDESHARE VERIFICATION

This application claims the benefit of U.S. Provisional Application No. 62/896,227, filed on Sep. 5, 2019. The disclosure of the above application is incorporated herein by reference in its entirety.

The present disclosure pertains to systems and methods related to ridesharing such as, e.g., for verifying riders correspond to rideshare trips of rideshare vehicles and for verifying that a rideshare trip occur.

Ridesharing applications, e.g., running on cellular telephones, provide taxi-like services to users. Users may select a destination and may be presented with various vehicle options, each with its own costs. Users may then select a vehicle option and provide additional relevant information. Then, the rideshare trip may be presented to one or more drivers. Once a driver has accepted a rideshare trip, users may be provided with an estimated time of arrival and may wait for the driver driving the rideshare vehicle to arrive at the users' location to pick-up up the users.

SUMMARY

The illustrative systems and methods may be described as providing, among other things, rideshare verification. For example, a verification code may be assigned to a rideshare trip and may be provided to a rider of the rideshare trip. The verification code may be received by a vehicle device assigned to the rideshare trip, e.g., by manual entry by the rider upon entry into the rideshare vehicle. Whether the rider has entered the correct rideshare vehicle for the rideshare trip may be verified based on the verification code assigned to the rideshare trip and the verification code received by the rideshare vehicle device.

An exemplary method of providing rideshare verification may include: assigning a verification code to a rideshare trip; transmitting the verification code to a rider device to be entered into a vehicle device; receiving rideshare data from the vehicle device; and determining whether the rideshare is verified based on the received rideshare data and the verification code.

In one or more embodiments, receiving rideshare data from the vehicle device may include receiving an entered code, and wherein determining whether the rideshare is verified may comprise verifying whether the rideshare based on the verification code and the entered code. In one or more embodiments, the exemplary method may further include transmitting rideshare trip information of the rideshare trip to a driver device of the rideshare vehicle in response to verification of the rideshare. The verification code may include a string of alphanumeric characters. In one or more embodiments, the method may further include providing terms and conditions to a driver device in response to verification of the rideshare and receiving acceptance of terms and conditions from the driver device.

In one or more embodiments, the method may further include engaging a magnet lock between the rider device and a driver device in response to verification of the rideshare. The method may still further include tracking a proximity of the rider device and the driver device while the magnet lock is engaged and disengaging the magnet lock based on the tracked proximity of the rider device and the driver device. In one or more embodiments, the method may further include tracking a location of the rider device and the driver device while the magnet lock is engaged and verifying the rideshare trip occurred based on the tracked location of the rider device and the driver device. The method may further include receiving verification of an age of one or more riders in response to verification of the rideshare.

In one or more embodiments, the method may further include tracking a location of the rider device and the driver device while the magnet lock is engaged. The method may further include determining that the rideshare trip is complete based on the tracked location. The method may further include determining that the magnet lock is still established based on the tracked location and determining that a time after the rideshare trip completed exceeds a threshold and that the magnet lock is still established. The method may further include alerting the driver that the magnet lock is still established.

In one or more embodiments, the method may further include receiving a rideshare trip request including rideshare trip information, wherein the rideshare trip information includes a request for a female driver and transmitting the rideshare trip request to only female drivers.

In one or more embodiments, the method may further include determining a driver for the rideshare trip based a driver preference, wherein the driver preference includes a female driver requiring the rideshare trip to include a registered female rider.

An exemplary method may include requesting a verification code from a rider in a rideshare vehicle, receiving the verification code, and verifying that the rideshare vehicle corresponds to a rideshare trip of the rider based on the received verification code. In one or more embodiments, verifying that the rideshare vehicle corresponds to a rideshare trip of the rider may include transmitting the received verification code to a rideshare server and receiving a verification confirmation from the rideshare server in response to transmission of the verification code.

In one or more embodiments, the method may further include displaying media to the rider after verification of the rideshare. The media may include a targeted advertisement based on at least profile data of the rider. The media may further include a targeted advertisement based on at least a route of the rideshare trip. In one or more embodiments, the method may further include tracking a location of the rideshare vehicle during the rideshare trip and the media may include a targeted advertisement based on at least the tracked location. In one or more embodiments, the media may include a coupon usable at a destination of the rideshare trip or a location along a route of the rideshare trip. In one or more embodiments, the method may further include displaying an incorrect vehicle message if the verification confirmation indicates that the rideshare vehicle does not correspond to the rideshare trip of the rider.

An exemplary method may include transmitting a rideshare confirmation to a rideshare server in response to receiving user input indicating acceptance of a rideshare request for a rideshare trip, receiving a rider location for the rideshare trip from the rideshare server, displaying the received rider location, determining that the rider location has been reached, and receiving rideshare trip information. The rideshare trip information may include a rideshare route and a rideshare destination after the rideshare server verifies that the rideshare vehicle corresponds to the rideshare trip of the rider.

In one or more embodiments, the method may further include receiving a request to acknowledge terms and conditions of the rideshare trip from the rideshare server and transmitting a terms and conditions confirmation in response to receiving user input indicating acceptance of the terms and conditions.

In one or more embodiments, the method may further include providing a selectable assistance button. The method may further include presenting two selectable buttons in response to the selectable assistance button being selected. The method may further include alerting law enforcement in response to a selection of a selectable button of the two selectable buttons indicating that a user needs assistance.

An exemplary method may include transmitting a rideshare confirmation to a rideshare server, receiving a verification code from the rideshare server, displaying the verification code, and receiving a verification condition based on an entered verification code provided to a vehicle device and the verification code.

In one or more embodiments, the method may further include tracking a location of the rider during the rideshare trip if the verification condition indicates that the rideshare vehicle corresponds to the rideshare trip of the rider and transmitting the tracked location of the rider to the rideshare server or a media server. In one or more embodiments, the method may further include determining that the rideshare destination has been reached based on the tracked location of the rider and displaying a rideshare trip termination message. In one or more embodiments, the method may further include receiving media from the media server. In one or more embodiments, the method may further include displaying rider terms and conditions based on the received verification condition.

An exemplary method may include tracking a collocation, or co-location, of a vehicle device and a rider device, verifying whether a rideshare trip has ended based on the vehicle device and the rider device separating for a threshold period of time, and ceasing tracking the collocation of the vehicle device and the rider device based on the rideshare trip ending.

In one or more embodiments, the method may further include determining a rideshare trip distance and time based on the tracked collocation of the vehicle device and the rider device and the rideshare trip ending. Tracking the collocation of the vehicle device and the rider device may include monitoring a signal strength between the vehicle device and the rider device. Tracking the collocation of the vehicle device and the rider device may further include tracking the location of one or more (e.g., each of) the vehicle device, the driver device, and the rider device. Tracking the collocation of the vehicle device and the rider device may further include determining whether a distance between the vehicle device and the rider device is below a threshold distance. In one or more embodiments, the method may further include determining that a deviation from the rideshare route has occurred based on the tracked location of the rideshare vehicle and providing a safety inquiry to the rider. In one or more embodiments, providing a safety inquiry may include displaying a message to the rider.

In one or more embodiments, the method may further include determining if the rider is wearing a mask.

An exemplary system for coordinating a rideshare trip between a rideshare vehicle and a rider may include a computing apparatus including one or more processors. The one or more processors may be configured to assign a rideshare verification code to a rideshare trip; transmit the assigned rideshare verification code to a rider device to be entered into a vehicle device positioned with the vehicle of the rideshare; receive rideshare data from the vehicle device and determine whether the rideshare is verified based on the received rideshare data and the assigned rideshare verification code.

An exemplary rideshare vehicle device for use in a rideshare vehicle to display rideshare trip information and receive input may include a computing apparatus including one or more processors. The one or more processors may be configured to request a verification code from a rider in the rideshare vehicle, receive the verification code, and verify that the rideshare vehicle corresponds to a rideshare trip of the rider based on the received verification code.

An exemplary rideshare rider device to allow a rider to request a rideshare and receive rideshare trip information may include a display and a computing apparatus comprising one or more processors operably coupled to the display. The one or more processors may be configured to receive a rideshare verification code from a rideshare server, display the received rideshare verification code on the display, and receive a verification condition based on an entered verification code provided to a vehicle device and an assigned verification code.

An exemplary rideshare driver device to display rideshare information to a driver and receive driver input may include a display and a computing apparatus comprising one or more processors operably coupled to the display. The one or more processors may be configured to transmit a rideshare confirmation to a rideshare server in response to receiving user input indicating acceptance of a rideshare request for a rideshare trip, receive a rider location for the rideshare trip from the rideshare server, display the received rider location on the display, determine that the rider location has been reached, and receive rideshare trip information comprising a rideshare route and a rideshare destination after the rideshare server verifies that the rideshare vehicle corresponds to the rideshare trip of the rider.

An exemplary system to allow a rider to provide media to a rider may include a computing apparatus including one or more processors. The one or more processors may be configured to receive rider information from a rideshare server, determine at least one media item for the rider based on the received rider information, and transmit the at least one media item in response to receiving a confirmation that the rideshare trip has been verified.

An exemplary system may include a vehicle device to display rideshare trip information and receive input and a rideshare server comprising one or more processors and operably coupled to the display. The one or more processors may be configured to assign a rideshare verification code to a rideshare trip, transmit the assigned rideshare verification code to a rider device to be entered into the vehicle device, receive rideshare data from the vehicle device, and determine whether the rideshare is verified based on the received rideshare data and the assigned rideshare verification code.

In one or more embodiments, the vehicle device may include one or more processors configured to request a verification code from a rider in a rideshare vehicle, receive the verification code, and verify that the rideshare vehicle corresponds to a rideshare trip of the rider based on the received verification code.

In one or more embodiments, the one or more processors of the vehicle device may be further configured to display a name of the rider and a rider selected background color.

In one or more embodiments the system may further include a rider device to allow a rider to request a rideshare and receive rideshare trip information. The rider device may include a display and one or more processors operably coupled to the display. The one or more processors may be configured to receive the rideshare verification code from the rideshare server, display the rideshare verification code on the display, and receive a verification condition based on an entered verification code provided to a vehicle device and the verification code.

In one or more embodiments, the system may further include a driver device to display rideshare information to a driver and receive driver input. The driver device may include a display and one or more processors operably coupled to the display. The one or more processors may be configured to transmit a rideshare confirmation to a rideshare server in response to receiving user input indicating acceptance of a rideshare request for a rideshare trip, receive a rider location for the rideshare trip from the rideshare server, display the received rider location on the display, determine that the rider location has been reached, and receive rideshare trip information comprising a rideshare route and a rideshare destination after the rideshare server verifies that the rideshare vehicle corresponds to the rideshare trip of the rider.

In one or more embodiments, the system may further include a media server to provide media to a rider. The media server may include one or more processors configured to receive rider information from the rideshare server, determine at least one media item for the rider based on the received rider information, transmit the at least one media item to the vehicle device in response to receiving a confirmation that the rideshare trip has been verified.

In one or more embodiments, the system may further include an exterior vehicle device. The exterior vehicle device may include a display and one or more processors operably coupled to the display. The one or more processors of the exterior vehicle device may be configured to receive a rider name of the rideshare data from the vehicle device and display the received rider name.

BRIEF DESCRIPTION OF THE DRAWINGS

FIG. 2 is a flow diagram of an illustrative method, or process, for a rideshare server to determine if a rideshare is verified.

FIGS. 3A-3C depict a flow diagram of another illustrative method, or process, for a rideshare server to determine if a rideshare is verified.

FIG. 4 is a flow diagram of an illustrative method, or process, for a rideshare magnet lock.

FIG. 5 is a flow diagram of an illustrative method, or process, for a vehicle device to verify a rideshare.

FIG. 9 is a flow diagram of an illustrative method, or process, for a rider device to verify a rideshare.

DETAILED DESCRIPTION OF EXEMPLARY EMBODIMENTS

Figure 1:
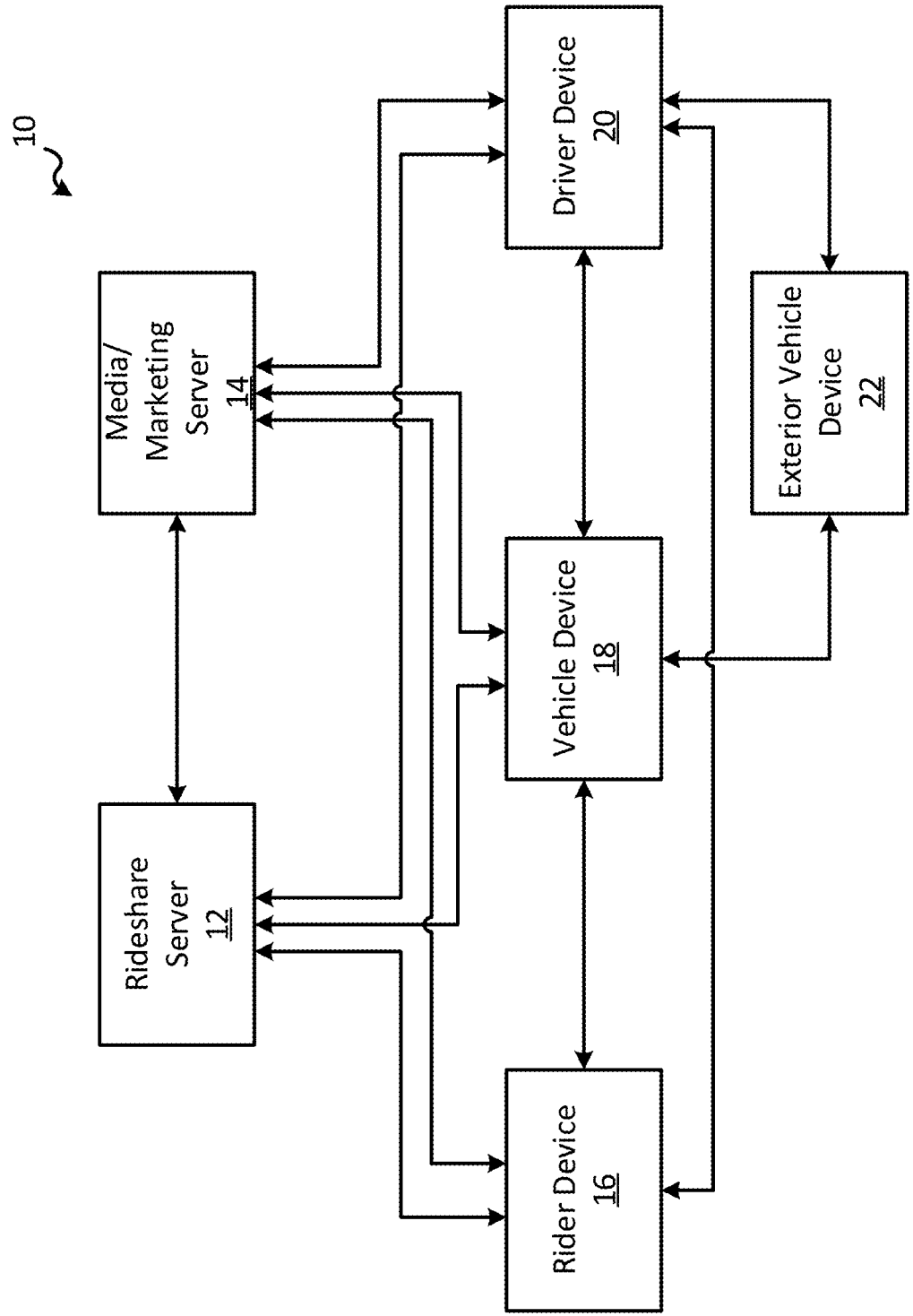
FIG. 1 is a block diagram of an illustrative rideshare tracking and verification system.

Illustrative systems and methods shall be described with reference to FIGS. 1-14. It will be apparent to one skilled in the art that elements or processes from one embodiment may be used in combination with elements or processes of the other embodiments, and that the possible embodiments of such systems and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

In general, the present disclosure describes various systems and methods for verifying a rideshare. The disclosure herein will use the terms "rideshare," "rideshare trip," "rideshare vehicle," "rider," and "driver." As used herein, it is to be understood that a "rideshare" is an arrangement in which a passenger (e.g., a "rider") travels from one destination to another (e.g., "rideshare trip") in a private vehicle (e.g., a "rideshare vehicle") driven by its someone else (e.g., a "driver," often the owner of the vehicle). As described herein, each participant (e.g., the rider and the driver) and vehicle (e.g., the rideshare vehicle) may have their own device to coordinate and facilitate the rideshare trip.

The disclosure herein will use the terms "rider information" and "targeted ad." As used herein, it is to be understood that "rider information" may include any suitable information about a rider including, e.g., age, sex, search engine history, purchase history, social media use history, social media profile information, music service history, video service history, etc. As used herein, it is to be understood that a "targeted ad" may include any of an advertisement, coupon, offer, etc. presented to a rider based on that rider's rider information, information related to the rideshare and rideshare trip.

The disclosure herein will use the terms "verification code" and "magnet lock." As used herein, it is to be understood that a "verification code" may be any set of alphanumeric characters, symbols, image or images, audible sounds (e.g., passcode, phrase, etc.), rider characteristics (e.g., facial recognition, biometrics, voice recognition, personal code, etc.), etc. that may be assigned to a rideshare. The verification code may be used to determine whether a rider is associated with a particular rideshare vehicle and/or driver for a rideshare trip. Such verification may provide protection to riders and drivers to ensure that riders do not accept rides from drivers that are not associated with the rideshare and that drivers do not accept riders that are not associated with the rideshare.

As used herein, it is to be understood that a "magnet lock" may be a process that establishes a proximity connection between a rider and a rideshare vehicle. During the magnet lock, a location of a rider and the rideshare vehicle may be tracked to determine whether a rideshare trip actually took place. The magnet lock may persist even if the rideshare trip is cancelled by either the rider or the driver after the rideshare has been verified. The magnet lock may only be removed when the rider and the rideshare vehicle are determined to be at least a threshold distance apart for at least a threshold period of time. After the magnet lock is removed, the location of the rider and/or the rideshare vehicle during the magnet lock may be evaluated to determine whether the rideshare trip occurred. Thereby, the rideshare company may be protected from fraudulently-cancelled rideshares. Additionally, riders may be protected from drivers that fraudulently extend the length and/or duration of rideshare trips. Further, emergency contacts of the rider may be alerted if the rideshare trip is cancelled while the magnet lock is in place. The emergency contacts may be provided with location information of the rider to assist in ensuring the rider's safety.

An exemplary system 10 for use in facilitating ridesharing, providing illustrative rideshare verification and providing illustrative magnet lock functionality further described herein is depicted in FIG. 1. The rideshare system 10 may include a rideshare server 12, a media/marketing server 14, a rider device 16, a vehicle device 18, a driver device 20, and an exterior vehicle device 22. As depicted by the arrows, each of the servers 12, 14 and the devices 16, 18, 20 may be operatively coupled to one another. Furthermore, exterior vehicle device 22 may be operatively coupled to the vehicle device 18 and the driver device 20. As used herein, "operatively coupled" may include any suitable combination of wired and/or wireless data communication. Wired data communication may include, or utilize, any suitable hardware connection such as, e.g., ethernet, peripheral component interconnect (PCI), PCI express (PCIe), optical fiber, local area network (LAN), etc. Wireless communication may include, or utilize, any suitable wireless connection such as, e.g., Wireless Fidelity (Wi-Fi), cellular network, Bluetooth, near-field communication (NFC), optical, infra-red (IR), etc. In at least one embodiment, each of the rideshare server 12, the media/marketing server 14, the rider device 16, the vehicle device 18, and the driver device 20 may each be operatively coupled to the Internet, and in turn, operatively coupled to each other via the Internet. In at least one embodiment, one or more devices such as, e.g., the vehicle device 18 and the driver device 20, may be directly operatively coupled to each other (e.g., without being operatively coupled to another network such as the Internet). It is to be understood that each of the rideshare server 12, the media/marketing server 14, the rider device 16, the vehicle device 18, and the driver device 20 may be operatively coupled to each to other in practically any configuration so as to provide the functionality as described herein.

Furthermore, each of the rideshare server 12, the media/marketing server 14, the rider device 16, the vehicle device 18, the driver device 20, and the exterior vehicle device 22 may include any suitable apparatus, devices, or systems for coordinating and verifying a rideshare. Apparatus, devices, or systems for coordinating and verifying a rideshare may include, e.g., input devices, communication systems, displays, positioning systems, processors, controllers, sensors, microphones, speakers, etc. An input device as used herein may include any suitable device for receiving input such as, e.g., a touchscreen, keyboard, microphone, remote control, computer mouse, smart pen, camera, etc. Communication systems as used herein may include any suitable systems or devices for communicating with other devices wired or wirelessly. In other words, communication systems may include any suitable apparatus or devices for operably coupling to other devices or systems. For example, communication systems may include antennas, network interface cards (NIC), subscriber identification cards (SIM), modems, etc.

Displays as used herein may include any apparatus or devices for providing visual or tactile information to a user. Displays may include, e.g., liquid crystal display (LCD) panels, organic light emitting diode (OLED) display panels, tactile displays, lights (e.g., LEDs), etc. Positioning systems as used herein may include any one or more devices configured to provide position information (e.g., 3D position data, 2D position data, latitude data, longitudinal data, altitude data, etc.) of the associated system or device (e.g., rideshare server 12, the media/marketing server 14, the rider device 16, the vehicle device 18, the driver device 20, and the exterior vehicle device 22). Positioning systems may include any apparatus, structure, or devices configured to receive and/or determine position data of the system. For example, positioning systems may include one or more antennas, receivers, transmitters, emitters, sensors, processors, imaging devices, etc.

The rideshare server 12 may be configured to provide the media/marketing server 14 with rideshare trip information. Rideshare trip information shared with media/marketing server 14 may include, e.g., rider information, location data, rideshare trip start location, rideshare trip destination, etc. Furthermore, the rideshare server may be configured to provide the media/marketing server 14 with rider information. Rider information shared with the media/marketing server 14 may include any relevant information such as, e.g., search engine history, purchase history, social media use history, social media profile information, music service history, video service history, rideshare trip information, age, sex, purchase habits, entertainment habits, search engine history, purchase history, social media use, social media purchase history, music service likes/dislikes, media channel history (e.g., YouTube), online channel watching history (e.g., DTV Now, Hulu, Netflix, etc.), and any information that may be of value to potential advertisers and or entertainment service providers.

Additionally, in return, the rideshare server 12 may receive media from the media/marketing server 14 based on the rideshare trip information that was shared with the media/marketing server 14. Media may include ads, targeted ads, coupons, pictures, video, educational information, uniform resource locators (URLs), audio, television streams, movies, etc. The media may, in turn, be provided to one or more of the rider device 16, the vehicle device 18, the driver device 20, or the exterior vehicle device 22 as further described herein.

The rideshare server 12 may be operably coupled to the rider device 16 to facilitate the rideshare with the rider. The rideshare server 12 may provide, among other things, rideshare trip information to the rider device 16. Rideshare trip information provided to the rider device 16 may include terms and conditions, fees information, verification codes, driver availability, etc. Additionally, the rideshare server 12 may receive data or information from the rider device 16. Data received from the rider device 16 may include, e.g., rider information, rider device location data, destination data, magnet lock data, rider selected options (e.g., rider selected background color), etc.

The rideshare server 12 and the media/marketing server 14 may be operably coupled to the vehicle device 18 to provide the vehicle device 18 with various information related to the present rideshare, rideshare verification, marketing (e.g., targeted advertisements), and entertainment. For example one or both of the rideshare server 12 and the media/marketing server 14 may provide media to the vehicle device that may include, e.g., ads, targeted ads, coupons, pictures, video, educational information, uniform resource locators (URLs), etc. Further, as described herein, the rideshare server 12 may receive information from the vehicle device 18 such as, e.g., a vehicle device location, user inputs (e.g., media selections), verification codes, etc. Additionally, the media/marketing server 14 transmit rider information requests to the vehicle device 18 and the media/marketing server 14 may receive rider information from the vehicle device 18 in response to the rider information requests.

The rideshare server 12 may be operably coupled to the driver device 20 to provide the driver device 20 with rideshare trip information. Rideshare trip information may include, e.g., rider information, location data, rideshare trip start location, rideshare trip destination, terms and conditions, etc. Additionally, the rideshare server 12 may receive information from the driver device 20 including, e.g., rideshare confirmations, acceptance of terms and conditions, etc.

The media/marketing server 14 may be operably coupled to the rider device 16. The media/marketing server 14 may provide media to the rider device 16. Media may include ads, targeted ads, coupons, pictures, video, educational information, uniform resource locators (URLs), etc. Further, the media/marketing server 14 may receive media selections from the rider device 16, which would result in the media/marketing server 14 delivering such section media to the rider device 16. Additionally, the media/marketing server 14 transmit rider information requests to the rider device 16 and the media/marketing server 14 may receive rider information from the rider device 16 in response to the rider information requests from the rider device 16.

The media/marketing server 14 may be operably coupled to the driver device 20. The media/marketing server 14 may provide the driver device 20 media. Media may include ads, targeted ads, coupons, pictures, video, educational information, uniform resource locators (URLs), etc. The media/marketing server 14 may receive media selections from the rider device. Additionally, the media/marketing server 14 transmit rider information requests to the driver device 20 and the media/marketing server 14 may receive rider information from the driver device 20 in response to the rider information requests.

The rider device 16 may be operably coupled to the vehicle device 18. The rider device 16 may provide the vehicle device 18 with verification codes, rider information, rider preferences, rider selections (e.g., a rider selected background color, media choice, etc.), location data, sound, etc. Additionally, the rider device 16 may receive media from the vehicle device 18. Media may include ads, targeted ads, coupons, pictures, video, educational information, uniform resource locators (URLs), etc.

The rider device 16 may be operably coupled to the driver device 20. The rider device 16 may provide the driver device 20 with rider information, rideshare information, collocation, or co-location, information, etc. Additionally, the rider device 16 may receive data and information from the driver device 20 such as, e.g., collocation information, driver information, rideshare information, vehicle information, etc. Furthermore, the rider device 16 may receive media from the driver device 20 such as, e.g., coupons, educational information, URLs, etc.

The vehicle device 18 may be operably coupled to the driver device 20. The vehicle device 18 may provide the driver device 20 with rideshare trip information. Rideshare trip information shared with driver device 20 may include, e.g., rider information, location data, rideshare trip start location, rideshare trip destination, etc. Additionally, the vehicle device 18 may receive driver information from the driver device 20. Driver information may include age, likes, dislikes, hobbies, interests, etc. In one embodiment, the vehicle device 18 is operably coupled to the rideshare server 12 and the media/marketing server 14 via the driver device 20 through wired or wireless communication (e.g., WiFi, Bluetooth, etc.). Furthermore, the vehicle device 18 may receive media from the driver device 20 such as, e.g., coupons, educational information, URLs, etc.

The exterior vehicle device 22 may be operably coupled to the vehicle device 18 or the driver device 20. The vehicle device 18 or the driver device 20 may provide media to the exterior vehicle device 16. Media may include ads, targeted ads, coupons, pictures, video, educational information, uniform resource locators (URLs), etc. The vehicle device 18 or the driver device 20 may provide the exterior vehicle device 22 with rider information, rider preferences, rider selections (e.g., a rider selected background color, media choice, etc.), location data, sound, etc.

The exterior vehicle device 22 may include a display. The exterior vehicle device 22 may display any received media (e.g., ads, targeted ads, pictures, etc.), the rider's name, the rider selected background color, etc. Additionally, the exterior vehicle device 22 may include a sound emitting device (e.g., speaker, transducer, etc.) to emit sounds, music, messages, etc. In one embodiment, the exterior vehicle device 22 plays a rider selected audible tone or message. The audible tone or message may get faster and/or louder as the vehicle approaches the rider.

The rideshare and marketing servers 12, 14 may include one or more controllers including one or more processors configured to execute, or carry out, the methods and processes described herein. Additionally, the rideshare and marketing servers 12, 14 may include memory to store data, information, and processes as described herein.

Likewise, the rider, vehicle, driver, and exterior vehicle devices 16, 18, 20, 22 may include one or more controllers including one or more processors configured to execute, or carry out, the methods and processes described herein. Additionally, the rider, vehicle, driver, and exterior vehicle devices 16, 18, 20, 22 may include memory to store data, information, and processes as described herein. Furthermore, the rider, vehicle, driver, and exterior vehicle devices 16, 18, 20, 22 may include one or more displays for displaying rideshare information and media as described herein. Still further, the rider, vehicle, driver, and exterior vehicle devices 16, 18, 20, 22 may include any suitable user interface for receiving user input such as, e.g., a touchscreen, keyboard, mouse, microphone, etc.

An exemplary method, or process, 30 for verifying a rideshare at a rideshare server (e.g., rideshare server 12) is depicted in FIG. 2. The method 30 may include receiving a rideshare confirmation 32, assigning a first verification code 34, transmitting the first verification code 36, and determining if a rideshare is verified 38.

In at least one illustrative embodiment, a rideshare confirmation may be received 32 by the rideshare server from a rider device. The rideshare confirmation may indicate that a rider and driver have accepted a rideshare to provide a rideshare trip. In other words, the rideshare has been agreed to by both parties, driver and rider, and in response to such agreement, a rideshare confirmation may be generated and transmitted to, e.g., a rideshare server 12.

In response to receiving a rideshare confirmation, a verification code may be assigned to the rideshare trip 34. The verification code may be randomly generated by the ride share server 12. The verification code may include numbers, letters, symbols, a bar code, a matrix barcode, images, audio, colors, audible phrases, etc. In one embodiment, the verification code may consist essentially of a string of alphanumeric characters. In another embodiment, the verification code may include a string of all letters. In another embodiment, the verification code may include a string of all numbers. The verification code may be between about 3 characters to about 10 characters. In at least one embodiment, the verification code may be about 3 characters. In another embodiment, the verification code may be an audible or spoken sound such as e.g., a word, a phrase, etc. Various verification code types such as, e.g., audio, audible, images (e.g., bar codes, QR codes, etc.), symbols, or other verification codes that allow "hands free" delivery of the verification code may accommodate riders with disabilities. In one or more embodiments, the verification code may be assigned based rider preferences. For example, the rider may select or have a preferred verification code that is used for rideshare trips of the rider. Accordingly, the rideshare server may assign the preferred verification code as the verification code for the rideshare trip.

After the verification code is assigned, the verification code may be transmitted to the rider device from the rideshare server 36. The verification code may be transmitted using various techniques and processes. For example, the verification code may be transmitted via text messaging (e.g., Short message Service (SMS), Multimedia Messaging Service (MMS), etc.), email, in application messaging (e.g., within the rideshare application running on a ride device providing the rideshare functionality), etc. In essence, the transmission of the verification code to the rider device should result in the rider receiving the verification code so that the rider and/or rider device can use the verification code to verify the rideshare.

The method 30 may then include determining if the rideshare is verified 38 based on, at least, the verification code. For example, the verification code may be given, or provided, from the rider or rider device to one or more of a vehicle device, a driver device, or a driver, and then used to verify that the rider and rider device correspond to the rideshare provided by the rideshare vehicle.

To provide such verification, in at least one embodiment, the vehicle device may also receive the verification code from the rideshare server, and determine whether the rideshare is verified may include comparing the verification code that was entered by the rider or rider device to the verification code received directly from the rideshare server. If the verification codes match, or correspond, then the rideshare is verified. If the verification codes do not match, or correspond, then the rideshare is not verified. It is to be understood that this example is merely one embodiment, and other embodiments of rideshare verification are described further herein.

Figure 3A:
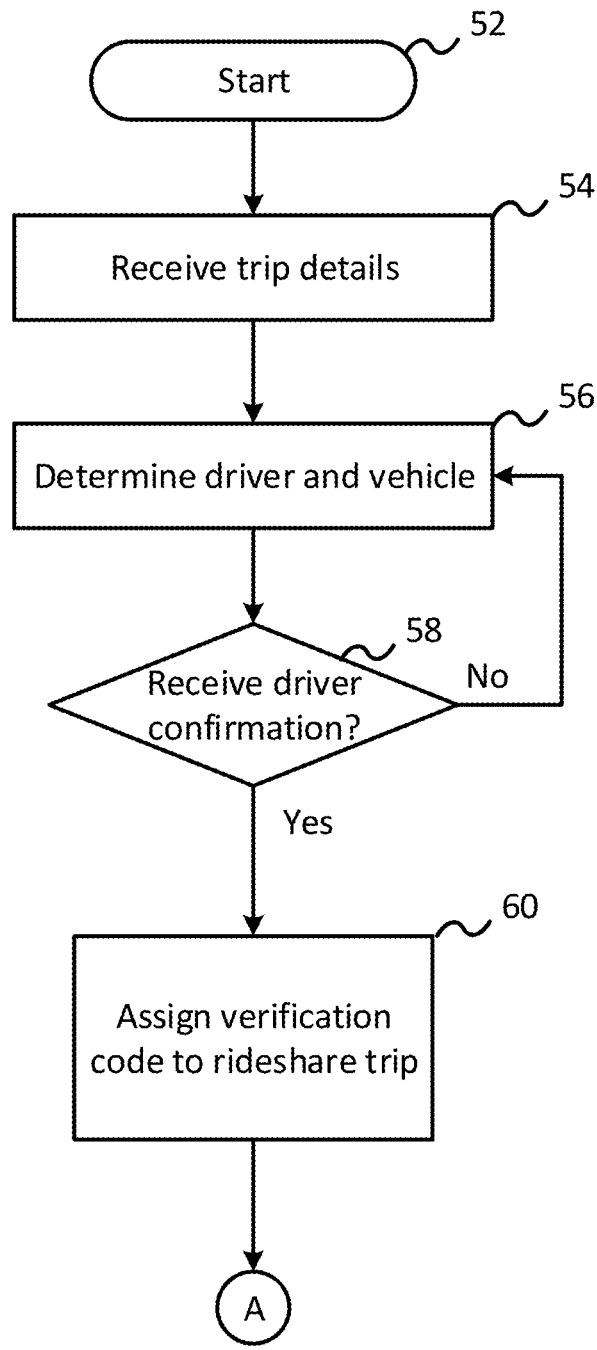

Another illustrative method, or process 50, for verifying a rideshare at a rideshare server is depicted in FIGS. 3A-3C. In other words, the illustrative method 50 may be run, or executed, on the rideshare server to provide rideshare verification functionality.

The method 50 may including starting 52 and receiving rideshare trip details 54 by the rideshare server. In one embodiment, the rider device may provide the rideshare trip details to the rideshare server. For example, the rider or rider's guardian may provide any details to the rideshare server that may be used to facilitate a rideshare trip. The rideshare trip details may include information about the rider, information about additional riders, desired vehicle type, destination of the rideshare trip, rideshare trip routing, rider preferences, rider selections, etc. In one embodiment, the rideshare trip details may include a specific disability of the rider and a requested verification type. In one embodiment, the rideshare trip details may include a female rider requiring a female driver for the rideshare trip. In one embodiment, the rider trip details may include the rider's guardian requiring a female driver for the rideshare trip. The requested verification type may be an alternative to a verification code or a particular modification to the verification code process such as, e.g., an audible verification code or a code shared between the rider and the drive.

After receiving the rideshare trip details, the method 50 may further include determining a driver and vehicle 56 for the rideshare trip. Determining a driver and vehicle 56 for the rideshare trip may be based on at least the received rideshare trip details. The driver device may be presented with generic information about the rideshare trip such as, e.g., distance and/or estimated time to the rider location, distance and/or estimated time to complete the rideshare trip, driver pay for the rideshare trip, etc. In at least one embodiment, the generic information about the rideshare trip does not include the destination of the rideshare trip. In other words, the rideshare server may determine an appropriate driver for the rideshare trip based on information received from the rider device and transmit generic rideshare trip information to the determined driver. In at least one embodiment, per the rideshare trip details, if any special type of vehicle is required to support a disability or handicap, including but not limited to wheelchair accessible, a rideshare request would only be transmitted vehicles or drivers that have confirmed that capability. In at least one embodiment, per the rideshare trip details, if a female driver is required, a rideshare request would only be transmitted to drivers registered as female.

Determining a driver and vehicle 56 for the rideshare trip may further be based on one or more driver preferences. Driver preferences may be received from the driver device. Driver preferences may include a female driver requiring a registered rider of the rideshare trip is female. Such preferences may be based on a time of day or manually set and updated by the driver. For example, a driver may set a preference of requiring a registered female rider after dark. If a registered female rider is required, the driver will only be sent rideshare requests that include a registered female rider. Whether the rideshare trip includes a registered female rider may be determined based on rider information. The rider information may be provided when the rider signs up for the rideshare server and/or when the rider requests a rideshare trip.

After the generic rideshare trip information is provided, the method 50 may further include determining whether the driver has confirmed or accepted the rideshare trip 58. Determining whether the driver has confirmed the rideshare trip 58 may include receiving a confirmation indication, acceptance of terms and conditions of the rideshare trip, a rejection indication, and/or a rejection of the terms and conditions of the rideshare trip. If the determined driver rejects the rideshare trip or the terms and conditions of the rideshare trip, the rideshare server may determine another driver and vehicle 56 for the rideshare trip. If the driver confirms the rideshare trip and the terms and conditions, the method 50 may proceed to assign a verification code 60 to the rideshare.

The rideshare server may assign a verification code to the rideshare trip 60 as described herein with respect to process 34 of FIG. 2. The rideshare server may link a vehicle and/or vehicle device (e.g., vehicle device 18 of FIG. 1) to the rideshare trip, and thereby, associate the verification code with the vehicle of the rideshare trip. In other words, the rideshare server generates an identifier (e.g., verification code) that is only assigned to a single rideshare trip and/or rideshare vehicle at any given time.

After the verification code is assigned to the rideshare trip 60, the method 50 may proceed to transmit rideshare trip information 74 to the rider device. The rideshare trip information may include the verification code assigned to the rideshare trip. Additionally, the rideshare trip information may include the make and model of the rideshare vehicle, the license plate number of the rideshare vehicle, the driver's name, the color of the rideshare vehicle, etc.

Additionally, after the verification code is assigned to the rideshare trip 60, the rideshare server may transmit rideshare information to the driver device 76. The rideshare information may include safety information. Safety information may include any notice about riders under the age of 18, the need for child seats, notice of a disabled passenger, etc. The rideshare information may include a pickup location of the rideshare trip. In at least one embodiment, the rideshare information does not include a destination of the rideshare trip. In other words, the rideshare server may provide the driver with rideshare information to allow the driver to pick up the rider or riders and any relevant safety information but may "hold back," or withhold, some information such as the destination of the rideshare trip.

Additionally, after the verification code is assigned to the rideshare trip 60, the rideshare server may transmit rideshare information to the vehicle device 77. The rideshare information may include the rider's name, rider preferences, and/or rider selections. For example, the rider may select a color, symbol, or image to be displayed by the vehicle device. The color, symbol, or image may be displayed by the vehicle device to allow the rider to identify the vehicle associated with the rideshare trip. In other words, the rideshare server may provide rider selections to the vehicle device in order to provide visual confirmation and identification of the rideshare vehicle for the rider without the rider getting into the rideshare vehicle. Additionally, the vehicle device may provide the color, symbol, or image to be displayed to an exterior vehicle device. The color, symbol, or image may be displayed by the exterior vehicle device to allow the rider to identify the vehicle associated with the rideshare trip.

After the appropriate rideshare trip information has been transmitted 74, 76, 77, the rideshare server may receive a rider verification code 78. The rider verification code may be entered, or input, into the vehicle device by a rider or a rider device, and then transmitted from the vehicle device to the rideshare server. Once the rider verification code is received, the method 50 may proceed to determine if the rideshare trip is verified based on the received verification code 80. In at least one embodiment, the rider verification code may be compared to the verification code assigned to the rideshare trip. The rideshare trip may be verified based on the comparison of the rider verification code and the verification code assigned to the rideshare trip.

If the rideshare trip is not verified, the method 50 may proceed to determine if a threshold number of attempts has been reached 82. The rideshare server may keep track of, or store, the number of times verification has been attempted for a particular rideshare. The rideshare server may compare the number of verification attempts for the rideshare the threshold number. The threshold number may be any suitable number such as, e.g., between 3 attempts and 10 attempts. In at least one embodiment, the threshold number is 3. If the threshold number is reached, then rideshare is terminated 88 because, e.g., the correct verification code for the rideshare was not entered within the threshold number of attempts. If the threshold number has not been reached, the verification process may be attempted again as the rideshare server may receive an additional rideshare verification 78. In other words, a number of verification attempts may be allowed by the rideshare server, but the rideshare may be cancelled if the number of allowed verification attempts is exceeded.

If the rideshare trip is verified, the method 50 may proceed to establish a magnet lock 84. The magnet lock may include tracking the location of at least the rider device. Additionally, the magnet lock may track locations of the vehicle device and/or driver device. Additionally, or alternatively, the magnet lock may track a collocation of the rider device to either of the vehicle device or the driver device. Through such tracking, the magnet lock may allow the rideshare server to determine if the rideshare occurred, or took place, based on tracked locations of the rider device, vehicle device, and/or driver device. The magnet lock is described in more detail in reference to FIG. 4.

In addition to establishing a magnet lock 84, the method 50 may further include transmitting terms and conditions to the driver device 86. Terms and conditions may include rider safety information, duties of the driver, notification of a disabled passenger, a verification type, etc. After transmitting the terms and conditions, the rideshare server may determine if the driver has accepted the terms and conditions 90. For example, a driver via the driver device may have an opportunity to review the terms and conditions for the rideshare and either accept or reject such terms and conditions. Thus, the rideshare server may receive an acceptance or denial of the terms and conditions from the driver device. If the rideshare server receives a denial of the terms and conditions, the rideshare may be terminated 88. In one embodiment, acceptance of the terms and conditions includes accepting a verification type for a disabled rider.

If the rideshare server receives acceptance of the terms and conditions, the rideshare server may transmit rideshare trip information to the driver device 92. The rideshare trip information may include a destination of the rideshare trip, a route of the rideshare trip, etc. In at least one embodiment, the rideshare trip destination and/or the rideshare trip route are only sent to the driver device after the rideshare trip has been verified and the driver has accepted the terms and conditions. In other words, certain details of the rideshare trip may be withheld, or hidden, from the driver until the rideshare is accepted by the driver via the driver device. In one embodiment, a rider selected code word or phrase is received from the rider device or rideshare server to be used by the driver for rider verification. The rider may provide the code word or phrase to the driver to verify the rideshare.

After transmitting the rideshare trip information to the driver device 92, the rideshare server may determine if the rideshare trip is complete 94 based on multiple sources of data. In at least one embodiment, the rideshare server may determine whether the rideshare trip is complete based on whether the magnet lock is still established. In another embodiment, the rideshare server may determine that the rideshare trip is complete based on a tracked location of the rider device and the destination data. In a still further embodiment, the rideshare server may determine that the rideshare trip is complete based on a collocation of the rider device and the vehicle and/or driver device and/or the trip information including the destination data. If the rideshare trip is not complete, the rideshare vehicle may continue to transmit trip information to the driver device 92.

If the rideshare server determines that the trip is complete, the rideshare server may transmit a departure message 96. The departure message may be transmitted to the rider device, the vehicle device, and/or the driver device. The departure message may include, e.g., a review link, rideshare trip summary information, coupons, etc. After the departure message is transmitted, the method 50 may end 98.

Alternatively, the method 50 may determine if the magnet lock is still established 100. If the magnet lock is not still established the method 50 ends 98. However, if the magnet lock is still established, the method 50 may determine if a threshold time has been reached 102. The threshold time may be 30 seconds, 2 minutes, or 3 minutes. In at least one embodiment the time threshold may be 3 minutes. If the threshold time has not been reached, the method 50 may continue to determine if the magnet lock is still established 100. If the threshold time has been reached, the method 50 may alert the driver that the rider device (e.g., cellular telephone) is likely still in the vehicle 104. To alert the driver, the method 50 may transmit an alert to the driver device and/or the vehicle device. The method 50 may proceed to determine if the magnet lock is still established 100 and continue to alert the driver 104 until the magnet lock is terminated.

An exemplary method, or process 110, for a magnet lock of a rideshare is depicted in FIG. 4. A magnet lock may be established 112 by a rideshare server (e.g., the rideshare server 12 of FIG. 1). A magnet lock may include periodically requesting and/or receiving location data of a rider device (e.g., rider device 16 of FIG. 1), a vehicle device (e.g., vehicle device 18 of FIG. 1), and/or a driver device (e.g., driver device 20 of FIG. 1).

The rideshare server may be configured determine whether the rider and rideshare vehicle are collocated 114 based on the received location data from one or more of the rider, driver, and vehicle devices. In at least one embodiment, collocation of the rider and rideshare vehicle are determined based on a distance between the rider device and the vehicle and/or driver devices. In one embodiment, the distance between the rider device and the vehicle and/or driver devices may be determined based on GPS locations provided by the rider, driver, and vehicle devices. In another embodiment, the distance between the rider device and the vehicle and/or driver devices may be determined based on nearfield wireless signaling via Bluetooth, RFID, or any other similar technology. In still another embodiment, the distance between the rider device and the vehicle and/or driver devices may be determined based on sound commonality. For example, if the rider, driver, and vehicle devices are in the same vehicle, such devices should also be able to "hear" the same sounds. Thus, the rider, driver, and vehicle devices may record sound from inside the vehicle, which may be compared to determine whether such devices are collocated. In another embodiment, the vehicle device may transmit one or more sounds and the rideshare server verifies that the driver device and the rider device received and/or recorded the one or more sounds.

To be collocated, the rider device and the vehicle device may be within at least, e.g., 1000 feet, 100 feet, or 50 feet. In at least one embodiment, the rider device and vehicle device may be within 50 feet to be collocated. In at least one embodiment, the collocation of the rider and the rideshare vehicle is determined based on a distance between the rider device and the driver device. To be collocated, the rider device and the driver device may be within at least, e.g., 1000 feet, 100 feet, or 50 feet. In at least one embodiment, the rider device and driver device may be within 50 feet to be collocated. If the rideshare server determines that the rider and the rideshare vehicle are collocated the magnet lock may be maintained.

If the rideshare server determines that the rider and the rideshare vehicle are not collocated, the rideshare server may determine whether a time threshold is met 116. The time threshold may be at least, e.g., 30 seconds, 2 minutes, or 3 minutes. In at least one embodiment the time threshold may be 3 minutes. In other words, the rideshare server may determine whether the rider and the rideshare vehicle have been apart for a sufficient time to determine that the rider and vehicle may have actually separated. If the time threshold period is met, the rideshare server may terminate the magnet lock 120. If the time threshold period is not met, the rideshare may maintain the magnet lock 118.

The rideshare server may be configured to determine if the rideshare is cancelled while the magnet lock in established, maintained, or in place 122. Whether the rideshare has been cancelled may be determined at any time while the magnet lock is in place. The rideshare server may determine whether the rideshare has been cancelled based on a notification or other form of communication from any of the rider device, the driver device, or the vehicle device. If the rideshare has not been cancelled, the magnet lock may continue to be maintained and the rideshare server may continue to determine if the rider and vehicle are collocated 114. If the rideshare has been cancelled, the rideshare server may alert the rider's emergency contacts 124. In other words, cancellation of the rideshare after the magnet lock has been established 112 may trigger an alert to notify appropriate parties or emergency contacts of the situation.

The rideshare server may alert the rider's emergency contacts 124 using any suitable method, e.g., phone call, text, email, etc. The rider's emergency contacts may be obtained from the rider during an account setup process or as a prerequisite for the rider to use the rideshare service or application. Additionally, the rider's emergency contacts may include local law enforcement. Local law enforcement may be determined based on a location of the rider or the location of any of the rideshare devices (e.g., rider device, vehicle device, and/or driver device). The number of emergency contacts may include, e.g., 1-5 emergency contacts. In at least one embodiment, the number of emergency contacts is 3. The alert may include any suitable information including, e.g., the rider's location, identification information of the driver, vehicle information, tracking information, etc. After the emergency contacts have been alerted 124, the magnet lock may be maintained and the rideshare server may continue to determine if the rider and vehicle are collocated 114. Maintaining the magnet lock after the emergency contacts have been alerted may allow the rideshare server to continue to monitor the rider's and the driver's locations. Additionally, maintaining the magnet lock may allow the rideshare server to provide updates to the emergency contacts.

An exemplary method, or process 140 for a vehicle device to verify a rideshare is depicted in FIG. 5. The process 140 includes requesting a verification code from a rider in a rideshare vehicle 142, receiving the verification code 144, and verifying the rideshare based on the received verification code 146. A vehicle device may display a request for a verification code 142. In at least one embodiment, the displayed request may include a verification code entry field.

In at least one embodiment, the displayed request may include instructions for the user to provide the verification code.

The vehicle device may receive the verification code (e.g., a rider verification code) 144. In at least one embodiment, the verification code may be received via a touchscreen keyboard or other user input. In at least one embodiment, the verification code may be received via wireless communication such as, e.g., Bluetooth, WiFi, NFC, etc. In at least one embodiment, the verification code may be received optically by a camera or other optical capture device. In at least one embodiment, the verification code may be received by a microphone to record the verification code such as when the verification code is an audible sound.

The rideshare may be verified based on the received verification code 146. In one embodiment, the rideshare vehicle may transmit the received verification code to a rideshare server (e.g., the rideshare server 12 of FIG. 1) for the rideshare server to verify the rideshare. The vehicle device may receive a verification indication from the rideshare server in response to transmitting the received verification code. In at least one embodiment, the vehicle device may receive a verification code assigned to the rideshare from the rideshare server and the vehicle device may determine whether the rideshare is verified based on the verification code assigned to the rideshare and the received verification code.

Figure 6A:
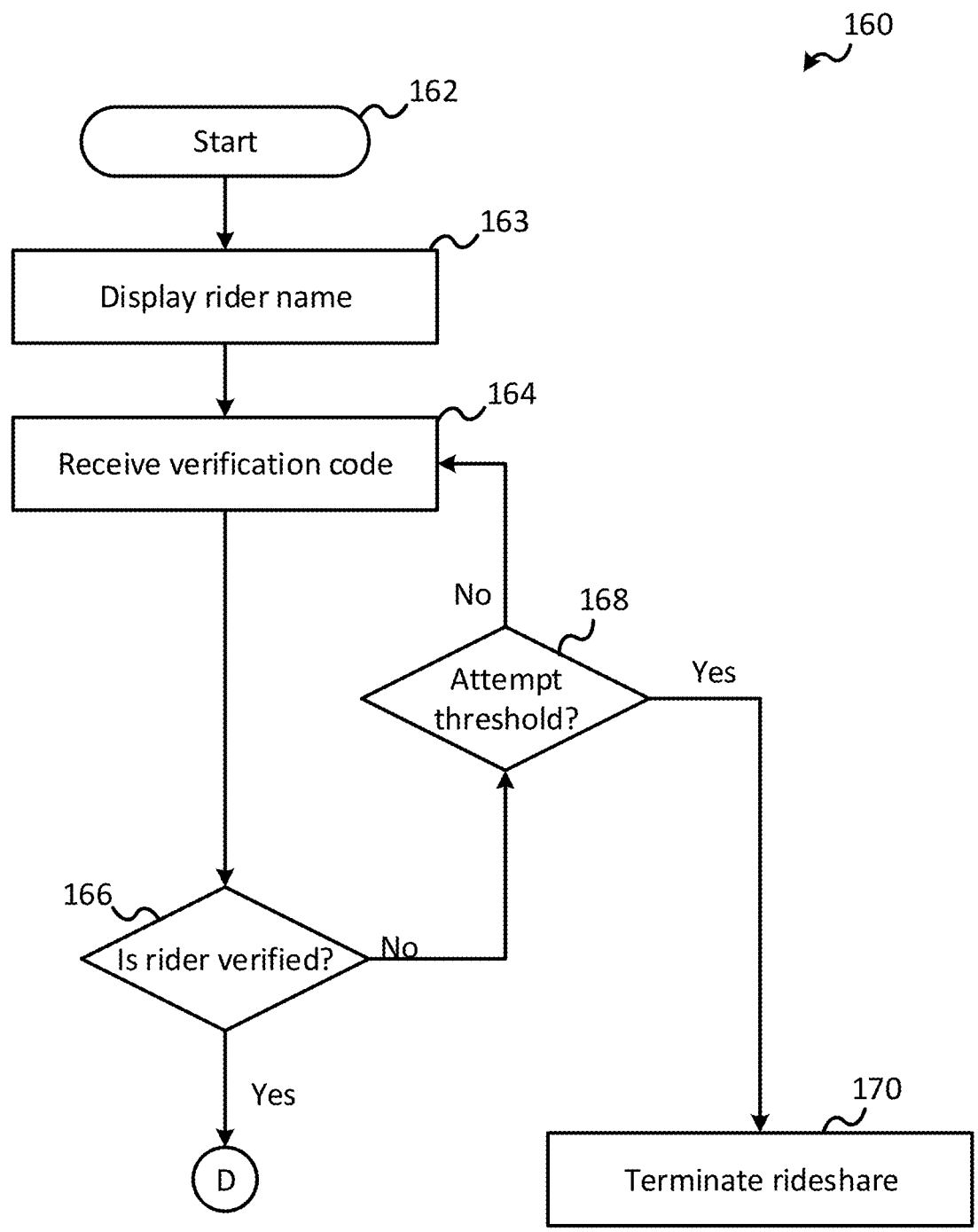
FIGS. 6A-6B depict a flow diagram of another illustrative method, or process, for a vehicle device to verify a rideshare.
Figure 6B:
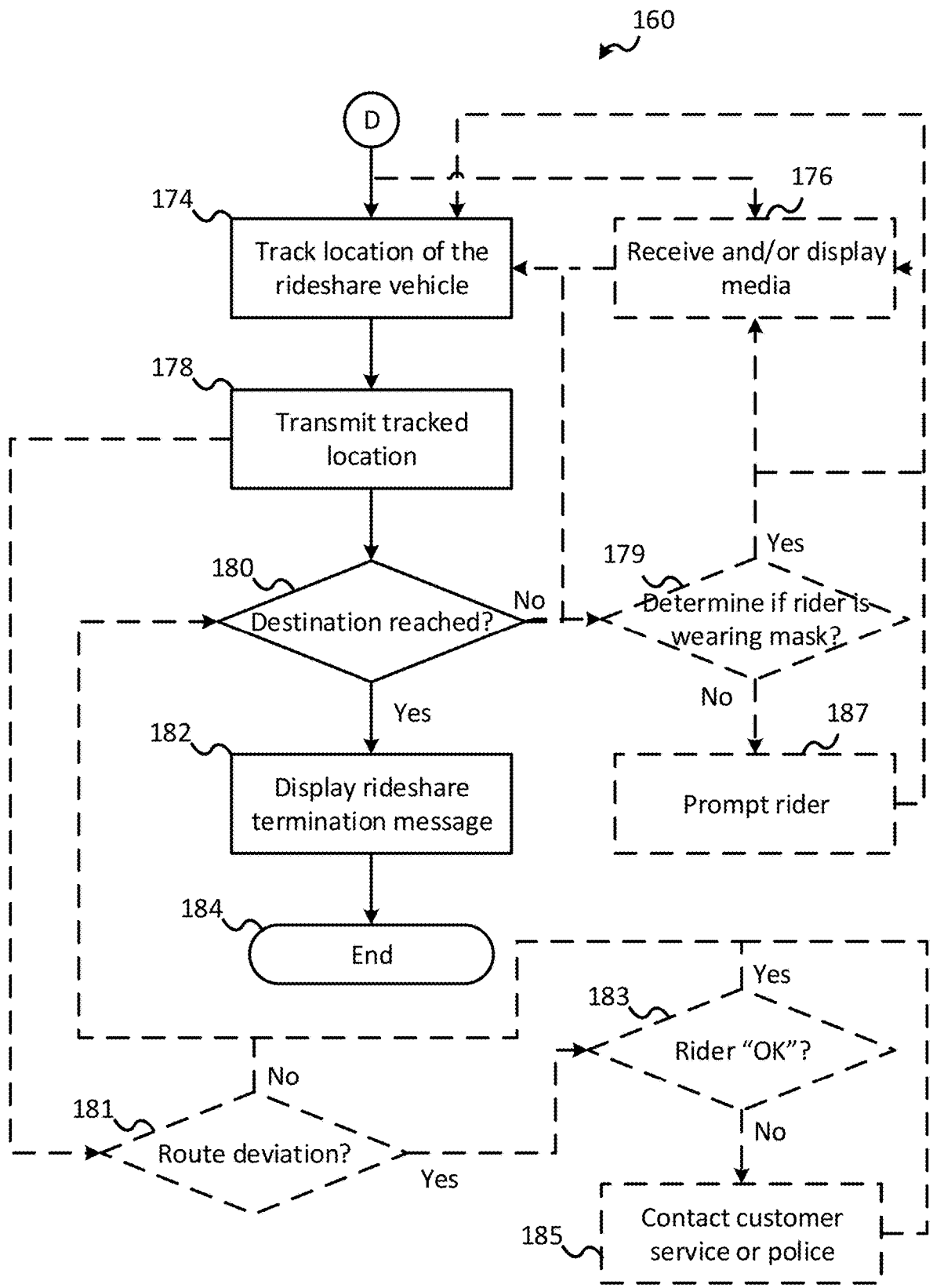

Another exemplary method, or process, 160 for verifying a rideshare at a vehicle device (e.g., vehicle device 18 of FIG. 1) is depicted in FIGS. 6A-6B. The process 160 starts 162 at FIG. 6A. The vehicle device may first display a rider name 163 on a display (e.g., located in the rideshare vehicle). The rider name may be received from a rideshare server (e.g., the rideshare server 12 of FIG. 1). The rider name may be displayed to help the rider find the correct rideshare vehicle. In one embodiment, a background color, symbol, and/or image may be displayed with the rider name. The background color, symbol, and/or image may be a rider selected color (e.g., blue, red, yellow, etc.), symbol, and/or image. In one embodiment, the vehicle device plays a rider selected audible tone or message. The audible tone or message may get faster as the vehicle approaches the rider.

The rideshare vehicle may receive a verification code 164 from a rider. In at least one embodiment, the verification code may be received via a touchscreen keyboard or other user input. In at least one embodiment, the verification code may be received via wireless communication such as, e.g., Bluetooth, WiFi, NFC, etc. In at least one embodiment, the verification code may be received optically by a camera or other optical capture device.

The rideshare may be verified based on the received verification code 166. In one embodiment, the rideshare vehicle may transmit the received verification code to a rideshare server (e.g., the rideshare server 12 of FIG. 1) for the rideshare server to verify the rideshare. The vehicle device may receive a verification indication from the rideshare server in response to transmitting the received verification code. In at least one embodiment, the vehicle device may receive a verification code assigned to the rideshare from the rideshare server and the vehicle device may determine whether the rideshare is verified based on the verification code assigned to the rideshare and the received verification code. In one embodiment, the vehicle device may further or alternatively verify the rideshare using facial recognition on the rider. The vehicle device may scan or record the rider's face and transmit an image of the rider's face for facial recognition.

If the rideshare trip is not verified based on the received verification code, the method 160 may proceed to determine if a threshold number of attempts has been reached 168. The vehicle device may keep track of or store the number of times verification has been attempted for the particular rideshare. The vehicle device may compare the number of verification attempts for the rideshare the threshold number. The threshold number may be any suitable number such as, e.g., between 3 attempts and 10 attempts. In at least one embodiment, the threshold number is 3. If the threshold number is reached, the rideshare may be terminated 170. If the threshold number has not been reached, the vehicle device may receive an additional rideshare verification 164. In other words, a number of verification attempts may be allowed by the vehicle device, but the rideshare may be cancelled if the number allowed verification attempts is exceeded.

If the rideshare trip is verified based on the received verification code, the method 160 may proceed to track the location of the rideshare vehicle 174. The rideshare vehicle may be tracked based on a location of one or both of the driver and vehicle devices. The location of the vehicle may be determined using GPS or any other suitable location tracking devices or methods. The tracked location may be transmitted to the rideshare server and/or a media/marketing server (e.g., media/marketing server 14 of FIG. 1) 178.

The method 160 may determine whether the rideshare trip destination has been reached 180. In at least one embodiment, the vehicle device may determine whether the rideshare trip destination has been reached based on the tracked location of the rideshare vehicle. In at least one embodiment, the vehicle device may determine whether the rideshare trip has been reached based on receiving a destination reached indication from the rideshare server and/or the driver device. If it is determined that the rideshare trip destination has not been reached, the method 160 may continue to track the location of the rideshare vehicle 174. Additionally, the method 160 may proceed to receive and/or display media 176 during the rideshare trip. Media may be received from the rideshare server and/or the media/marketing server. Received media may be displayed by the vehicle device. Displayed media may include a rideshare trip route, destination, estimated time to destination, advertisements, offers, etc. Each offer or advertisement may be displayed for a minimum amount of time, e.g., 30 seconds, 1 minute, 2 minutes, etc. If it is determined that the rideshare trip destination has been reached, the vehicle device may display a rideshare termination message 182.

Optionally, if it is determined that the rideshare trip destination has not been reached, the method 160 may determine if the rider is wearing a mask 179. In at least one embodiment, the vehicle device may determine whether the rider is wearing a mouth and nose covering. The vehicle device may use a camera and facial recognition algorithms to determine whether the rider's mouth and nose are covered to determine if the rider is wearing a mask for health and safety purposes. If the rider is not wearing a mask, the method 160 may proceed to prompt the rider to wear a mask until the rider puts on a mask 187. The prompt to the rider may include displaying a message and/or an audible message. If the rider is wearing a mask, the method 160 may proceed to receive and/or display media 176 or track the location of the vehicle 174.

Optionally, the method may determine if a deviation from the rideshare route has occurred 181. If no deviation from the rideshare route has occurred, the method 50 may proceed to determine if the rideshare destination has been reached

180. If a deviation from the rideshare route has occurred, the method 50 may provide a safety inquiry 183 such as asking whether the rider is "OK." For example, the vehicle device or rider device may display or provide an audible message asking the rider if they are "OK". The vehicle device and/or rider device may allow the rider to communicate directly with customer service or with police if the rider indicates there is a safety issue or concern 185. Finally, the method 50 may determine if the destination has been reached 180.

Figure 7:
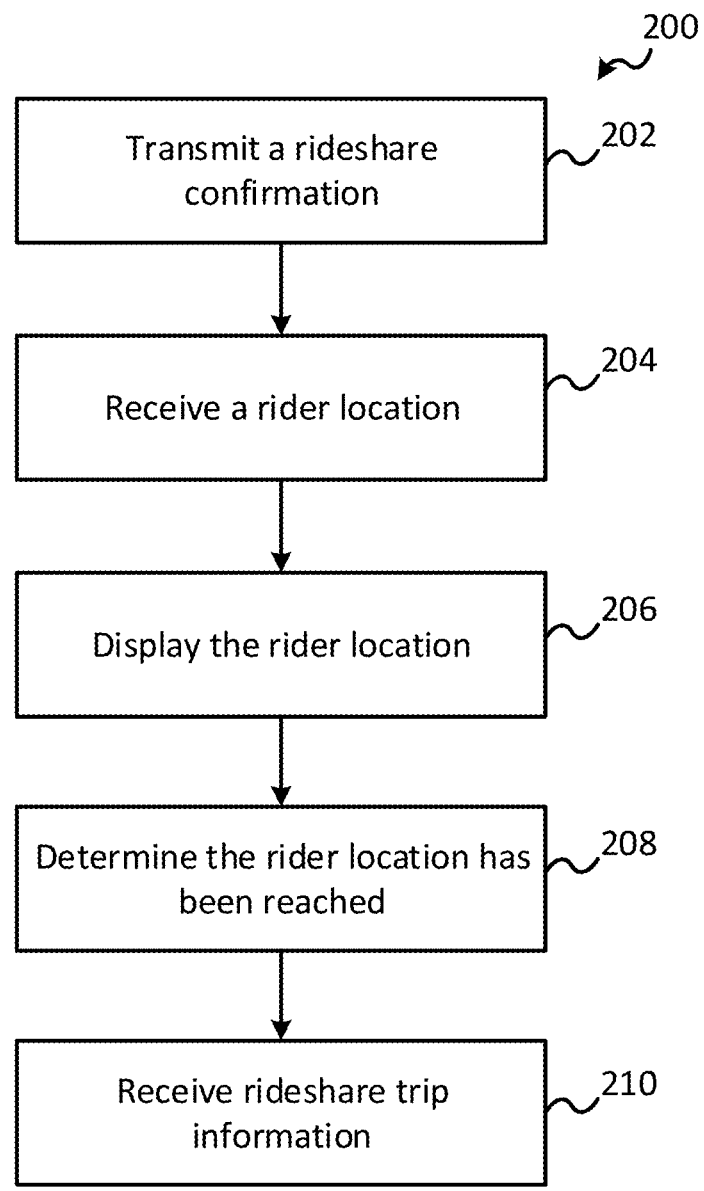
FIG. 7 is a flow diagram of an illustrative method, or process, for a driver device of a rideshare.

An exemplary method or process 200 for verifying a rideshare at a driver device (e.g., driver device 20 of FIG. 1) is depicted in FIG. 7. A rideshare confirmation may be transmitted to a rideshare server (e.g., the rideshare server 12 of FIG. 1) 202. The rideshare confirmation may be transmitted in response to receiving user input indicating acceptance of a rideshare request for a rideshare trip.

A rider location for the rideshare trip may be received from the rideshare server 204. The rider location may be received after the rideshare confirmation is received by the rideshare server. The received rider location may be displayed 206 by the driver device.

The driver device may determine whether the rider location has been reached 208. Whether the rider location has been reached may be determined based on a location of the driver device. The location of the driver device may be determined using GPS or any other suitable location hardware or method.

Rideshare trip information may be received 210. In at least one embodiment, the rideshare trip information is only received after the rideshare server verifies that the rideshare vehicle corresponds to the rideshare trip of the rider as described herein. The rideshare trip information may include and suitable information such as, the rider name, the rideshare route, the rideshare destination, etc.

Figure 8A:
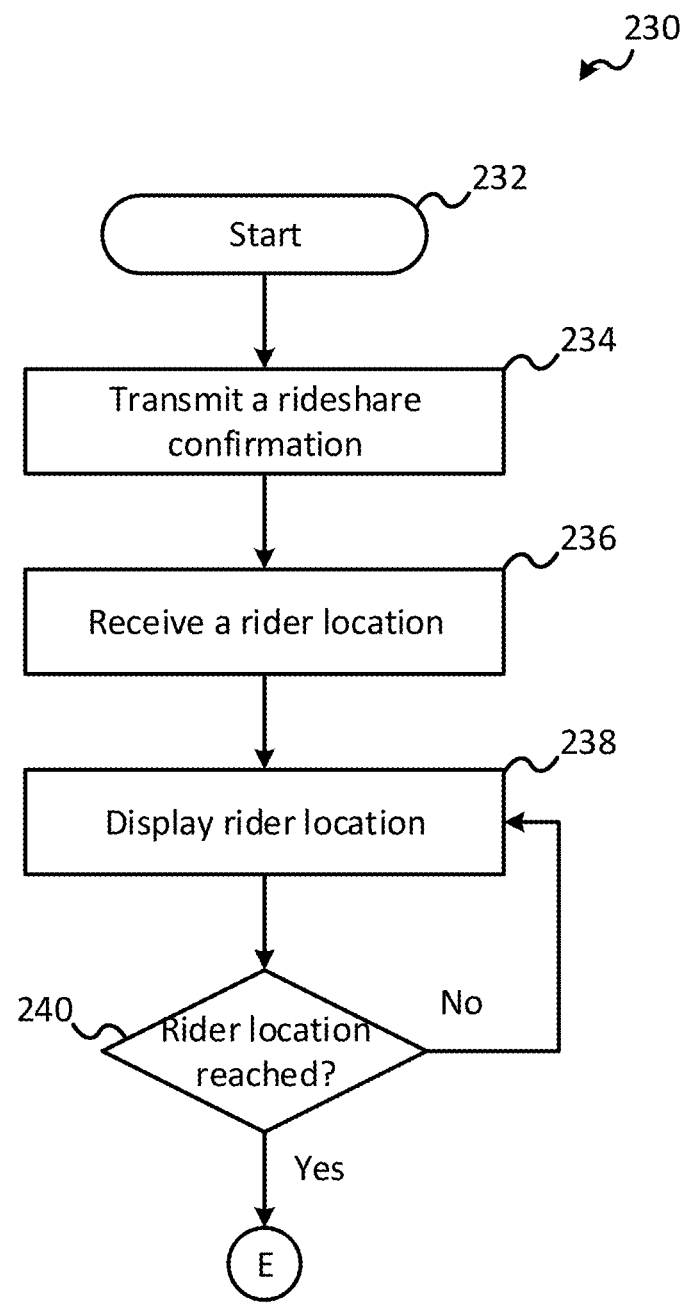
FIGS. 8A-8B depict another flow diagram of an illustrative method, or process, for a driver device of a rideshare.
Figure 8B:
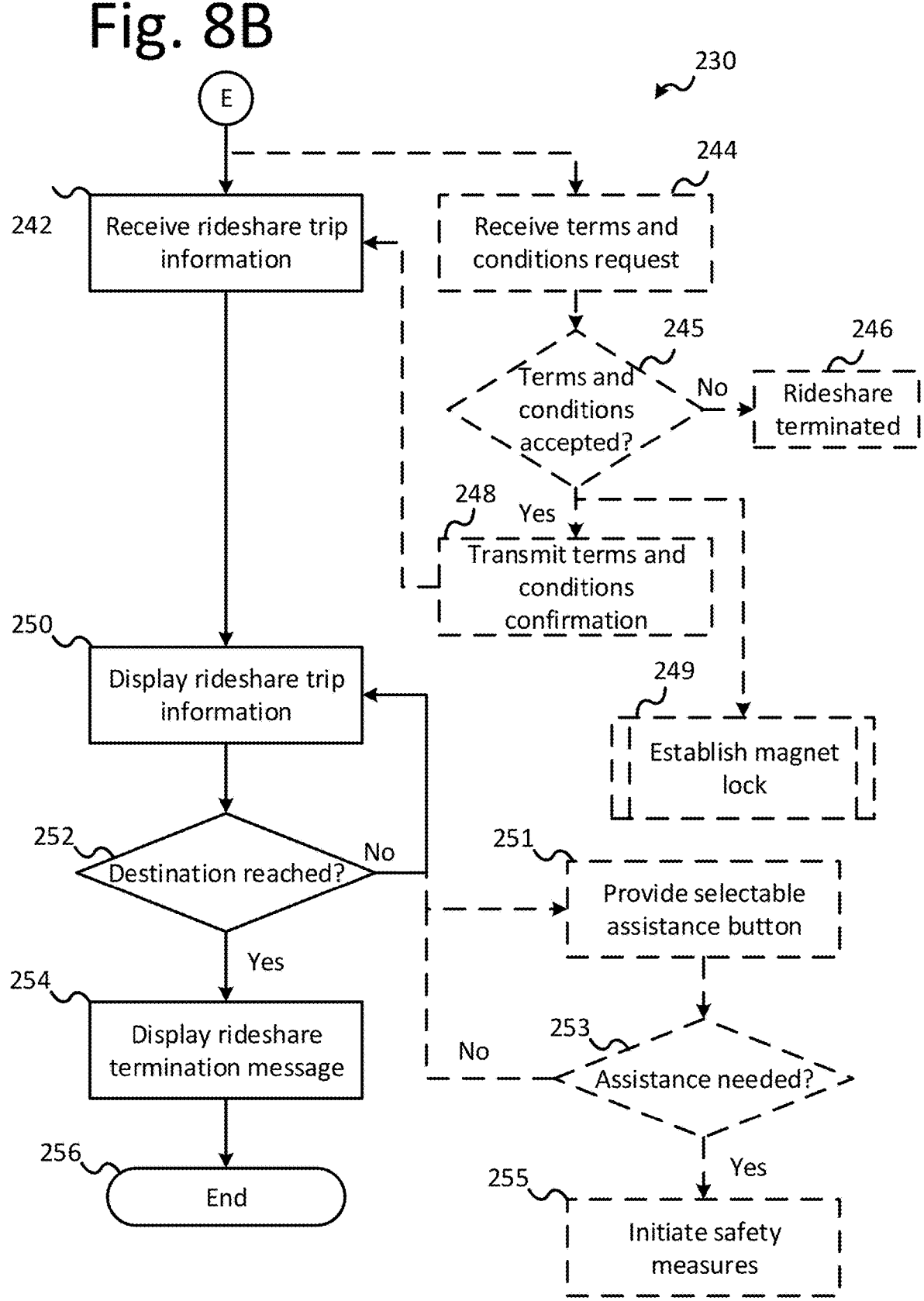

Another exemplary method or process 230 for verifying a rideshare at a driver device (e.g., driver device 20 of FIG. 1) is depicted in FIGS. 8A-8B. The method 230 starts 232 at FIG. 8A. A rideshare confirmation may be transmitted to a rideshare server 234. The rideshare confirmation may be transmitted by the driver device. The rideshare confirmation may be transmitted in response to receiving a user input indicating acceptance of a rideshare request.

A rider location may be received from the rideshare server 236. The rider location may be received in response to transmitting the rideshare confirmation. The received rider location may be displayed 238. The received rider location may be displayed by the driver device. Additionally, a route to the rider location may be displayed by the driver device. In other words, once the rider location is received, the driver device may provide any information necessary to reach the rider location.

It may be determined whether the rider location has been reached 240. The driver device may determine whether the rider location has been reached. Whether the rider location has been reached may be determined based on a location of the driver device. The location of the driver device may be determined using GPS or any other suitable location hardware or method.

Rideshare trip information may be received 242. In at least one embodiment, the rideshare trip information is only received after the rideshare server verifies that the rideshare vehicle corresponds to the rideshare trip of the rider as described herein. The rideshare trip information may include and suitable information such as, the rider name, the rideshare route, the rideshare destination, etc.

Alternatively, a terms and conditions request may be received 244 by the driver device. Terms and conditions may include rider safety information, duties of the driver, etc. It may be determined whether the terms and conditions have been accepted 245. Whether the terms and conditions have been accepted may be determined based on a user input. If the terms and conditions are rejected, or not accepted, the method 230 may proceed to terminate the rideshare 246. The rideshare may be terminated by the driver device and or the rideshare server. If the rideshare is terminated, the method 230 ends. If it is determined that the terms and conditions are accepted, a terms and conditions confirmation may be transmitted to the rideshare server 248. Subsequently, the method 230 may proceed to receive the rideshare trip information in response to the terms and conditions confirmation being transmitted.

The rideshare trip information may be displayed 250 on the driver device. The rideshare trip information that is displayed may include a rideshare trip destination, a rideshare trip route, etc.

It may be determined whether the rideshare trip destination has been reached 252. Determination of whether the rideshare trip destination has been reached may be based on a location of the driver device. The location of the driver device may be tracked using GPS or other location sensing hardware or methods. If the rideshare destination has not been reached, rideshare trip information may continue to be displayed 250. If the rideshare destination has been reached, a rideshare termination message may be displayed 254. The rideshare termination message may be displayed by the driver device. The rideshare termination message may include etc. The method 230 may end 256 after the rideshare termination message has been displayed.

Optionally, any time prior to the rideshare destination being reached, the method 230 may provide a selectable assistance button to the driver 251. The selectable assistance button may be presented on a graphical user interface of the driver device. Selection of the selectable assistance button may present the driver with two selectable buttons, one selectable button to indicate that the driver feels safe (e.g., "OK") and the other selectable button to indicate that the driver does not feel safe. The method 230 may determine whether the driver needs assistance based on which of the two selectable buttons is selected by the driver 253. If the driver selects the selectable "safe" button to indicate that they are safe, the method may continue to display rideshare trip information 250. If the driver selects the selectable "not safe" button to indicate that the driver needs assistance, the method 230 may initiate safety measures 255. Safety measures may include turning on one or more recording devices (e.g., recording using cameras of the driver device, the vehicle device, and/or the rider device) and summoning law enforcement.

An exemplary method or process 270 for verifying a rideshare at a rider device (e.g., rider device 16 of FIG. 1) is depicted in FIG. 9. A rideshare confirmation may be transmitted to a rideshare server 272 from the rider device. The rideshare confirmation may be transmitted in response to receiving user input indicating that the user is confirming the rideshare details.

A verification code may be received by the rideshare device from the rideshare server 274. The verification code may be received in response to the rideshare server receiving the transmitted rideshare confirmation. In at least one embodiment, the received verification code may be displayed 276 on the rider device such that, e.g., a user may be able to read, or see, the verification code. Thus, display of the verification code may allow the user to manually enter the verification code at a vehicle device (e.g., the vehicle device 18 of FIG. 1). In at least one embodiment, displaying the verification code may allow the vehicle device to capture an optical image of the verification code. Additionally, the verification code may be provided to the driver to input into the driver device, which may perform similar verification as the vehicle device.

A verification condition may be received based on a verification code received by the vehicle device 278. The verification condition may indicate whether the rideshare vehicle corresponds to the rideshare trip of the rider. In other words, the verification condition may indicate whether the rideshare was verified. If the rideshare trip is verified, the rideshare may proceed. If the rideshare trip is not verified, the verification code may be provided again by the user or the rideshare trip may be terminated.

Figure 10A:
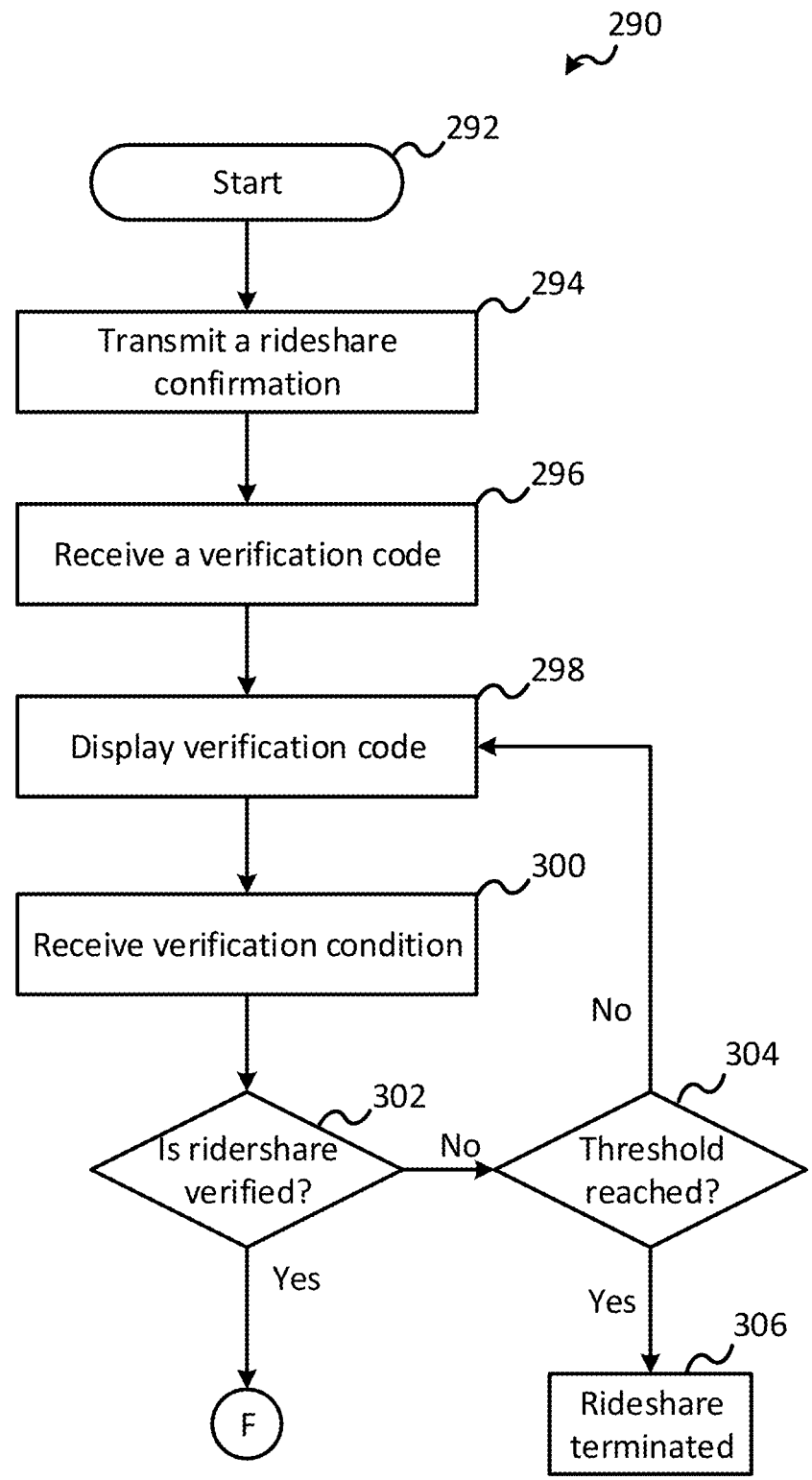
FIGS. 10A-10B depict another flow diagram of an illustrative method, or process, for a rider device to verify a rideshare.
Figure 10B:
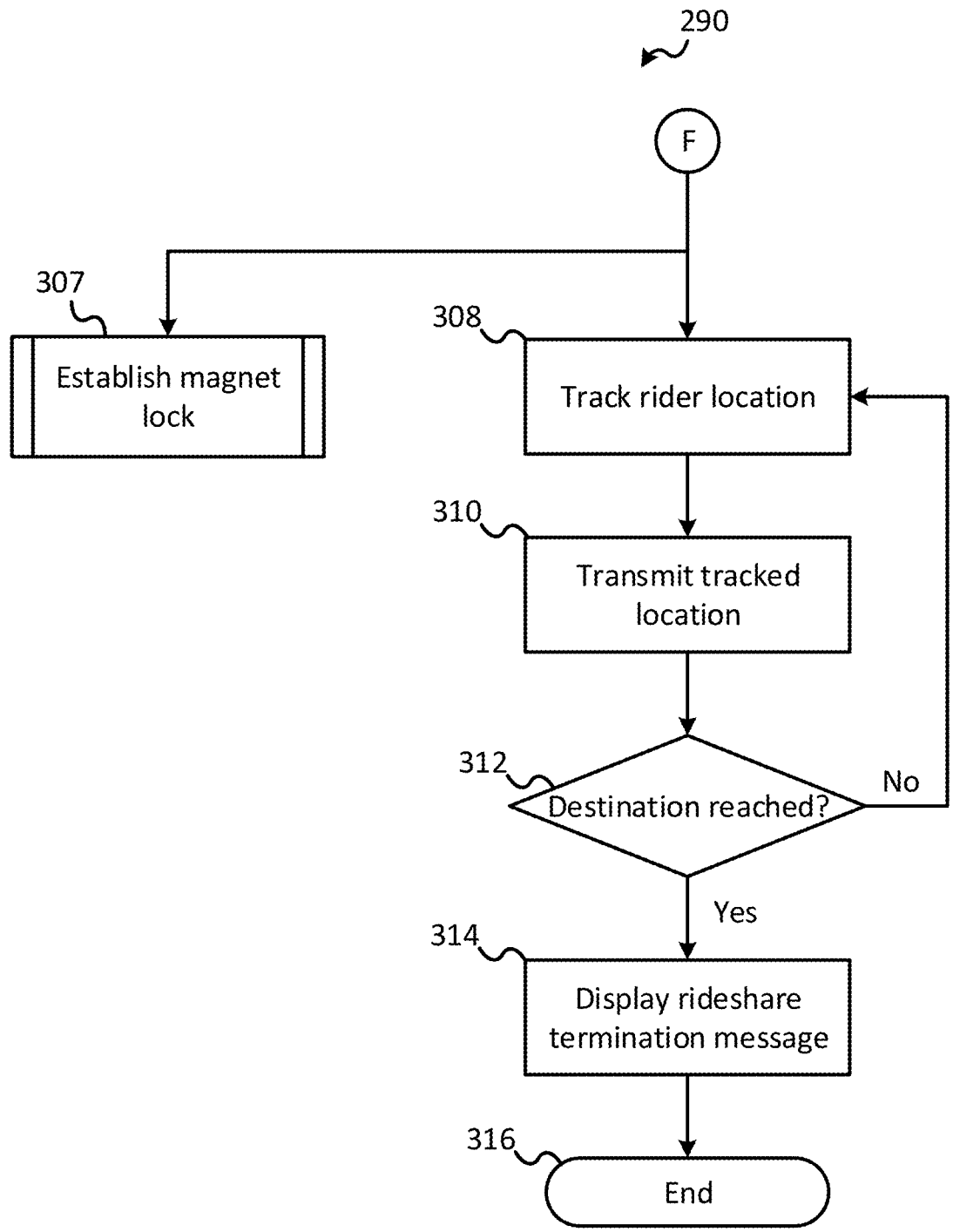

Another exemplary method or process 290 for verifying a rideshare at a rider device (e.g., rider device 16 of FIG. 1) is depicted in FIGS. 10A-10B. A rideshare confirmation may be transmitted to a rideshare server 294 from the rider device. The rideshare confirmation may be transmitted in response to receiving user input indicating that the user is confirming the rideshare details.

A verification code may be received by the rider device from the rideshare server 296. The verification code may be received in response to the rideshare server receiving the transmitted rideshare confirmation. The received verification code may be displayed on the rider device 298. The display of the verification code may allow the user to manually enter the verification code at a vehicle device (e.g., the vehicle device 18 of FIG. 1). In at least one embodiment, displaying the verification code may allow the vehicle device to capture an optical image of the verification code.

A verification condition may be received based on a verification code received by the vehicle device 300. The verification condition may indicate whether the rideshare vehicle corresponds to the rideshare trip of the rider. In other words, the verification condition may indicate whether the rideshare was verified.

It may be determined whether the rideshare is verified based on the received verification condition 300. If the rideshare is not verified, it may be determined if a threshold number of verification attempts has been reached 304. The threshold number of verification attempts may be any suitable number such as, e.g., between 3 attempts and 10 attempts. In at least one embodiment, the threshold number of verification attempts is 3. If the threshold number of attempts has been reached, the rideshare may be terminated 306. If the threshold number of attempts has not been reached, the verification code may be displayed 298 and verification may be attempted again.

If it is determined that the rideshare is verified based on the received verification condition, the method 290 may proceed to track the rider location 308. The rider location may be tracked based on the location of the rider device. The location of the rider device may be tracked using GPS or any other suitable sensor or method. The tracked location of the rider may be transmitted 310 to the rideshare server and/or a media server (e.g., the media/marketing server 14 of FIG. 1).

It may be determined whether the rideshare trip destination has been reached 312. If it is determined that the rideshare trip destination has not been reached, the method 290 may continue to track the rider location 308. If it is determined that the rideshare trip destination has been reached, the method 290 may proceed to display a rideshare termination message 314. After displaying the rideshare termination message, the method 290 may end 316.

Figure 11:
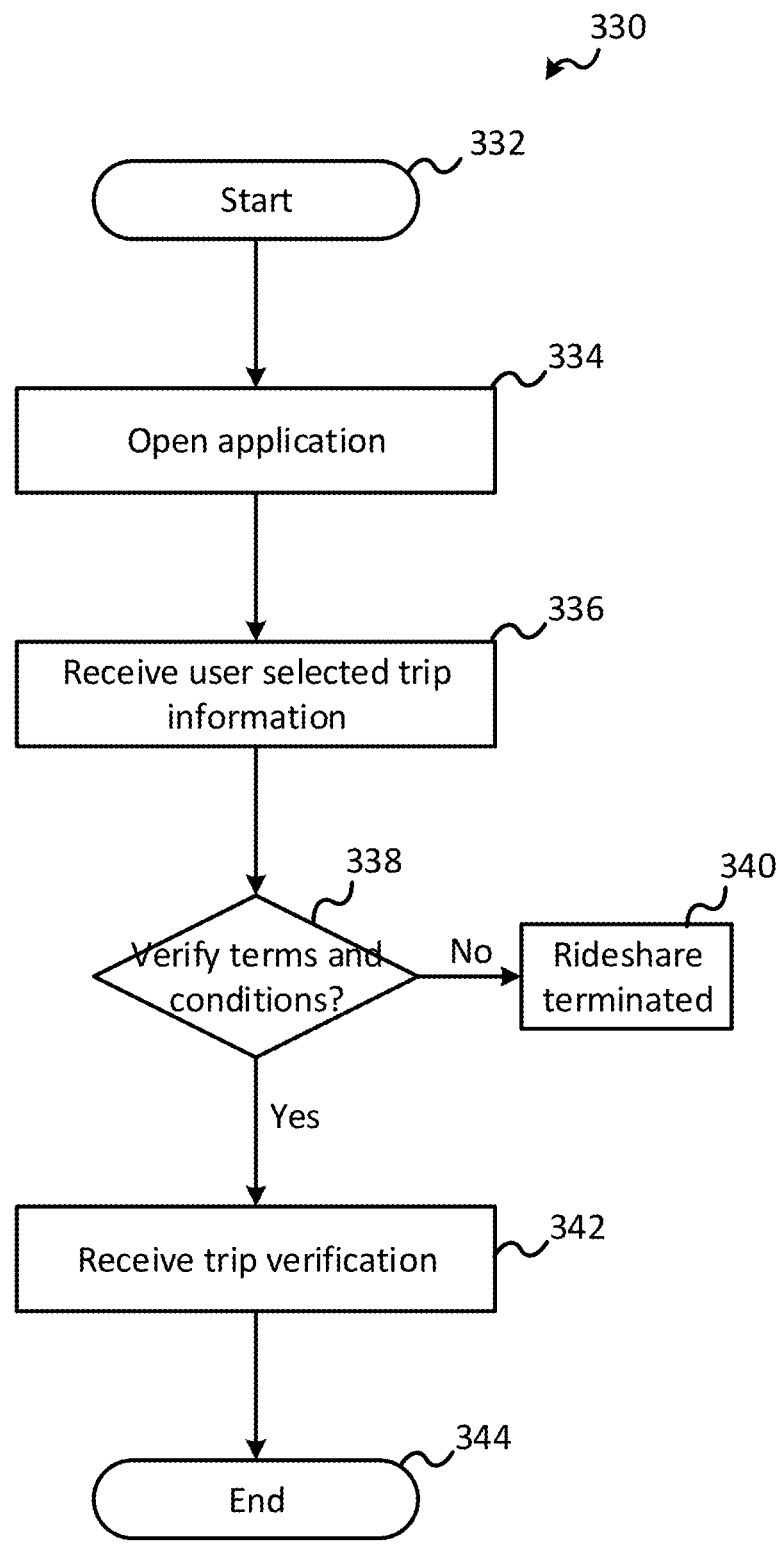
FIG. 11 is a flow diagram of an illustrative method, or process, for a rideshare request.

An exemplary method or process 330 for requesting a rideshare is depicted in FIG. 11. The method 330 includes starting 332 and then the rideshare application may be opened 334. The rideshare application may be opened on a rider device (e.g., the rider device 16 of FIG. 1) by a user. Rideshare information and options may be displayed to the user. The user may be the intended rider of the rideshare or the user may be setting up the rideshare for someone else.

User selected trip information may be received by the rider device 336. The trip information may be received via any suitable user input device such as, e.g., a touchscreen, keyboard, microphone, etc. User selected trip information may include, e.g., rider information, rideshare trip destination(s), vehicle type, rider selected background color(s), rider selected audible tones or messages, etc. In one embodiment, the rideshare information may include whether a special type of vehicle is required to support a rider disability, including, e.g., a wheelchair accessible vehicle. In one embodiment, selected trip information may include a female rider requiring a female driver. Rideshare requests including such a restriction may only be transmitted to drivers registered as female with the rideshare service. Rideshare requests including such rideshare information may only be transmitted to drivers and/or vehicles that have confirmed vehicle capabilities able to support the rider disability.

It may be determined whether terms and conditions of the rideshare are verified 338. The terms and conditions may be presented to a user in response to receiving user selected trip information. The terms and conditions may include safety requirements, requirements for disabled riders, etc. If it is determined that the terms and conditions of the rideshare were rejected, the rideshare may be terminated 340.

If it is determined that the terms and conditions of the rideshare were accepted by the rider, a rideshare trip verification may be received 342. The rideshare trip verification may include information about the rideshare driver and/or the rideshare vehicle such as, e.g., the driver name, a picture of the driver, the vehicle make and model, the vehicle color, the license plate number of the vehicle, etc. After the rideshare trip verification is received, the method 330 may end 344.

Figure 12:
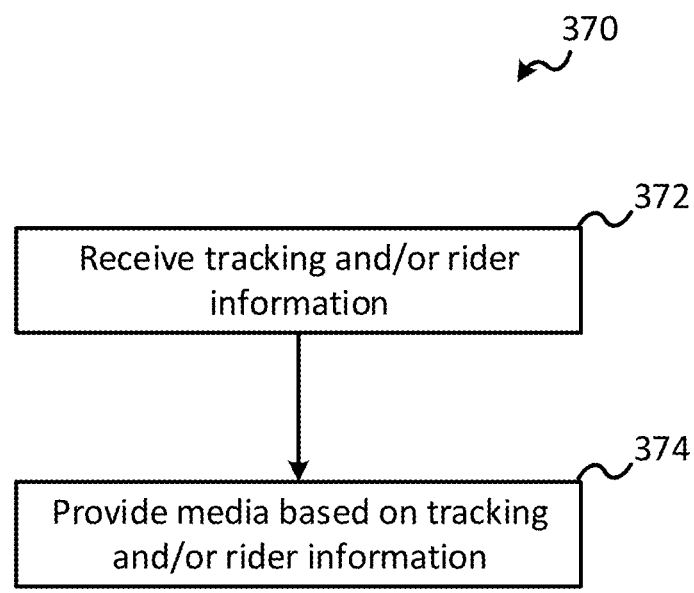
FIG. 12 is a flow diagram of an illustrative method, or process, for providing media during a rideshare.

An exemplary method or process 370 for providing media during a rideshare is depicted in FIG. 12. Tracking and or rider information may be received by a media server (e.g., the media/marketing server 14 of FIG. 1) 372. Tracking information may include GPS coordinates or other location data of a rider and/or a rideshare vehicle. The tracking information may be received periodically. Rider information may include any relevant information such as e.g., search engine history, purchase history, social media use history, social media profile information, music service history, video service history, home address, etc.

Media may be provided based on the tracking and/or rider information 374. Media may include ads, targeted ads, coupons, pictures, video, educational information, uniform resource locators (URLs), offers, offer codes, etc. In at least one embodiment, the media is a targeted ad.

Figure 13:
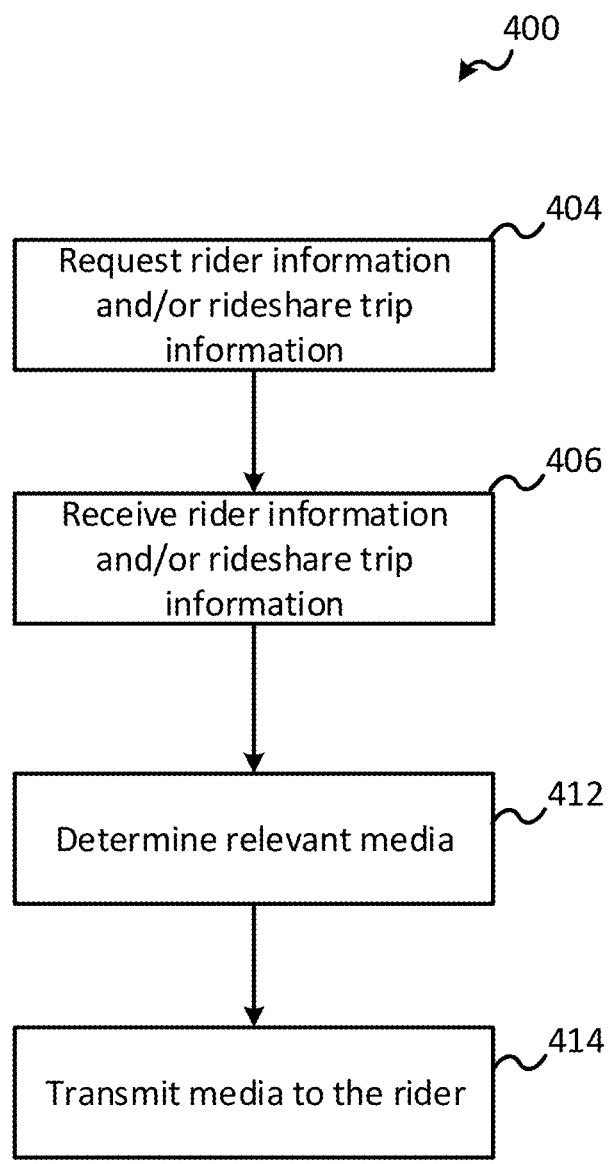
FIG. 13 is another flow diagram of an illustrative method, or process, for providing media during a rideshare.

Another exemplary technique or process 400 for providing media during a rideshare is depicted in FIG. 13. Rider information may be requested 404. Rider information may be requested from a rideshare server (e.g., the rideshare server 12 of FIG. 1), a rider device (e.g., the rider device 16 of FIG. 1), or any other server or rider information source. Rider information requested may include any relevant information such as, e.g., search engine history, purchase history, social media use history, social media profile information, music service history, video service history, rideshare trip information, age, sex, purchase habits, entertainment habits, search engine history, purchase history, social media use, social media purchase history, music service likes/dislikes, media channel history (e.g., YouTube), online channel watching history (e.g., DTV Now, Hulu, Netflix, etc.), and any information that may be of value to potential advertisers and or entertainment service providers. The rider may have agreed to provide the rider information to the rideshare server in return for using the associated rideshare service or application.

Additionally, rideshare trip information may be requested from the rideshare server 404. Rideshare trip information may include a rider location, a vehicle location, a rideshare trip route, a rideshare trip destination, etc. Rider information may be received 406. Rider information may be received in response to the transmitted rider information request from the rideshare server, a rider device, or any other server or rider information source.

Media to transmit to the rider may be determined based on the received rider information 412. In at least one embodiment, the media to transmit to the rider may be determined based on the received rider information including the rideshare trip route and/or destination. The determined media may be general advertisements based on demographics of the rider such as, e.g., age, sex, etc. The determined media may be targeted ads or opportunities that may be based on additional rider information such as, e.g., search engine history, purchase history, social media use history, social media profile information, music service history, video service history, etc. Additionally, the determined media may be route-based offers based on information such as, e.g., rideshare trip starting point, rideshare trip route, rideshare trip destination, etc. Advertisements may be locally based, e.g., local gyms, restaurants, etc. Advertisements may be nationally based such as, e.g., national brands, companies, franchises, etc.

The media may be transmitted to the rider 414. In at least one embodiment, the media may be transmitted to a vehicle device (e.g., the vehicle device 18 of FIG. 1) of the rideshare (e.g., and later transmitted to the rider device, if desired). The media may include entertainment options configured to encourage the rider to engage with the vehicle device. The media may include user selectable music, videos, channels, shows, offers, coupons, etc. In at least one embodiment, fulfillment of user selected media may be fulfilled via the rider device, e.g., selected coupons may be transmitted to the rider device. Such coupons may include coupons that are redeemable (e.g., immediately redeemable) at locations near the rideshare trip destination or along the rideshare trip route. Media transmission may be triggered by the rider device, the vehicle device, or the driver device. In at least one embodiment, the media may be transmitted to the rider device of the rideshare.

Figure 14:
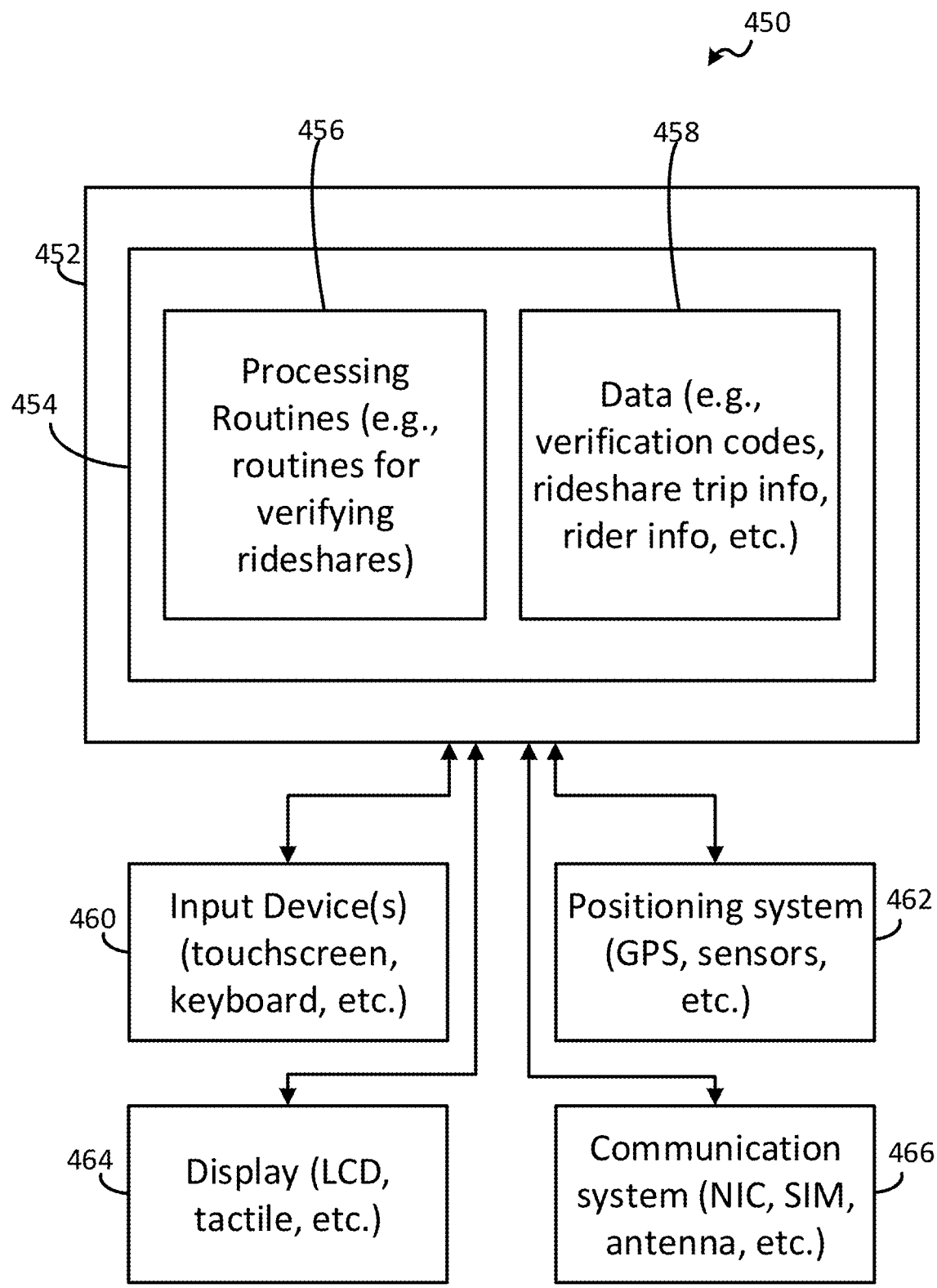
FIG. 14 is schematic illustration of a system including an exemplary system for rideshare verification in an embodiment.

A functional block diagram of an exemplary system 450 for use in coordinating and verifying a rideshare as described herein is depicted in FIG. 14. The system 450 may be representative of any systems or devices described herein for use in coordinating and verifying a rideshare such as, e.g., the rideshare server 12, the media/marketing server 14, the rider device 16, the vehicle device 18, the driver device 20, and the exterior vehicle device 22 of FIG. 1. The system 450 may include a processing apparatus, or a processor, 452, input device(s) 460, a positioning system 462, a display 464, and communication system(s) 466. Generally, the input device 460 may be operably coupled to the processing apparatus 452 and may include any one or more devices configured to allow a user to provide input to the processing apparatus 452. The input device 460 may include any apparatus, structure, or devices configured to receive input from a user. For example, the input device 460 may include one or more keyboards, mice, microphones, touchscreens, smart pens, etc.

Additionally, the input device 460 may be further described in terms of the various input modalities. For example, the input device 460 may be configured to receive touch inputs from a user using a touchscreen display, keystrokes of a keyboard, voice commands, gesture commands, etc. In essence, the input device 460 may be configured to provide input capabilities in various locations, mediums, and conditions to, e.g., to receive verification codes, rideshare confirmations, terms and conditions confirmations, rider input, driver input, etc. In one or more embodiments, the processing apparatus 452 may be configured to receive voice commands or audible input from rider, especially in cases where the rider is blind or is incapable of providing touch and/or mechanical input.

The system 450 may additionally include a positioning system 462 operably coupled to the processing apparatus 452. Generally, the positioning system 462 may include any one or more devices configured to provide position information (e.g., 3D position data, 2D position data, latitude data, longitudinal data, altitude data, etc.) of the system 450 to the processing apparatus 452. The positioning system 462 may include any apparatus, structure, or devices configured to receive and/or determine position data of the system 450. For example, the positioning system 462 may include one or more antennas, receivers, transmitters, emitters, sensors, processors, imaging devices, etc.

Additionally, the positioning system 462 may be further described in terms of the various positioning determination modalities. For example, the positioning system 462 may be configured to determine position data of the system 450 using GPS, radar, radio, sonar, image parallax, stereo imaging, photon time of flight, acoustic time of flight, radioactive decay time, material phase change (e.g., fluorescent, phosphorescent, etc.), scintillation, temperature change, etc. In one or more embodiments, the positioning system 462 may be configured to receive and determine position data of system 450 to e.g., determine if a rider, driver, and or vehicle are collocated.

The system 450 may additionally include a display 464 operably coupled to the processing apparatus 452. The display 464 may include any one or more devices configured to provide visual and tactile information to a user. For example, the display 464 may include one or more monitors, screens, liquid crystal display panels, organic light emitting diode panels, tactile displays (e.g., braille or moveable bump displays), lights, etc.

The system 450 may additionally include a communication system 466 operably coupled to the processing apparatus 452. The communication system 466 may include any one or more devices configured to operably couple the system 450 to other devices and systems. For example, the communication system 466 may include one or more antennas, network interface cards (MC), subscriber identification cards (SIM), modems, transmitters, receivers, transceivers, etc.

Further, the processing apparatus 452 includes data storage 454. Data storage 454 allows for access to processing programs or routines 456 and one or more other types of data 458 that may be employed to carry out the exemplary methods, processes, and algorithms of coordinating and verifying a rideshare. For example, processing programs or routines 456 may include programs or routines for performing computational mathematics, matrix mathematics, Fourier transforms, image registration processes, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, location tracking, audio comparison, learning algorithms, biomimetic computation, or any other processing required to implement one or more embodiments as described herein.

Data 458 may include, for example, rideshare information, verification codes, rider information, driver information positional data captured by positioning system 462, arrays, meshes, grids, variables, counters, statistical estimations of accuracy of results, results from one or more processing programs or routines employed according to the disclosure herein (e.g., rideshare verification, establishing and maintaining a magnet lock, etc.), or any other data that may be necessary for carrying out the one or more processes or methods described herein.

In one or more embodiments, the system 450 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the system 450 may be controlled using a computer readable storage medium, configured with a computer program, where the storage medium so configured causes the computer to operate in a specific and predefined manner to perform functions described herein.

The processing apparatus 452 may be, for example, any fixed or mobile computer system (e.g., a personal computer or minicomputer). The exact configuration of the computing apparatus is not limiting and essentially any device capable of providing suitable computing capabilities and control capabilities (e.g., control the display of the system 450, the acquisition of data, such rideshare trip data) may be used. Further, various peripheral devices, such as a computer display, mouse, keyboard, memory, printer, scanner, etc. are contemplated to be used in combination with the processing apparatus 452. Further, in one or more embodiments, the data 458 (e.g., rider information, rideshare information, driver information, magnet lock data, image data, an image data file, an array, a mesh, a high-resolution grid, a digital file, a file in user-readable format, coordinate data, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 452 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The methods described in this disclosure, including those attributed to the systems, or various constituent components, may be implemented, at least in part, in hardware, software, firmware, or any combination thereof. For example, various aspects of the techniques may be implemented by the processing apparatus 22, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 22 to support one or more aspects of the functionality described in this disclosure.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A method of providing rideshare verification to confirm whether a rider has entered an assigned rideshare vehicle comprising:
   assigning a verification code to a rideshare trip associated with the assigned rideshare vehicle;
   transmitting the verification code to a rider device to be entered into a vehicle device of the assigned rideshare vehicle associated with the rideshare trip to allow the rider to confirm that they have entered the rideshare vehicle of the rideshare trip;
   receiving rideshare data from the vehicle device to confirm that the rider has entered the assigned rideshare vehicle of the rideshare trip;
   determining the rideshare is verified based on the received rideshare data and the verification code, wherein the determination that the rideshare is verified confirms that the rider of the rideshare trip has entered the assigned rideshare vehicle of the rideshare trip;
   engaging a magnet lock between the rider device and the assigned rideshare vehicle of the rideshare trip in response to verification of the rideshare, wherein the magnet lock establishes a proximity connection between the rider and the assigned rideshare vehicle of the rideshare trip based on at least data collected by the rider device;
   tracking a proximity of the rider device and one or more of a driver device and the vehicle device while the magnet lock is engaged; and
   disengaging the magnet lock based on the tracked proximity of the rider device and the one or more of the driver device and the vehicle device.

2. The method of claim 1, wherein receiving rideshare data from the vehicle device comprises receiving an entered code, wherein determining the rideshare is verified comprises verifying the rideshare based on the verification code and the entered code.

3. The method of claim 2, further comprising transmitting rideshare trip information of the rideshare trip to a driver device of the rideshare vehicle in response to verification of the rideshare.

4. The method of claim 1, wherein the verification code comprises a string of alphanumeric characters.

5. The method of claim 1, further comprising:
   providing terms and conditions to a driver device in response to verification of the rideshare; and
   receiving acceptance of terms and conditions from the driver device.

6. The method of claim 1, further comprising:
   tracking a location of the rider device and one or more of a driver device and the vehicle device while the magnet lock is engaged; and
   verifying the rideshare trip occurred based on the tracked location of the rider device and one or more of the driver device and the vehicle device.

7. The method of claim 1, further comprising receiving verification of an age of one or more riders in response to verification of the rideshare.

8. A method of providing rideshare verification to confirm whether a rider has entered an assigned rideshare vehicle comprising:
   requesting a verification code associated with the assigned rideshare vehicle from a rider in a rideshare vehicle;
   receiving the verification code to confirm that the rider has entered the assigned rideshare vehicle;
   verifying that the rideshare vehicle corresponds to a rideshare trip of the rider based on the received verification code, wherein verifying that the rideshare vehicle corresponds to the rideshare trip of the rider confirms that the rider has entered the assigned rideshare vehicle, wherein verifying that the rideshare vehicle corresponds to a rideshare trip of the rider comprises:
      transmitting the received verification code to a rideshare server; and
      receiving a verification confirmation from the rideshare server in response to transmission of the verification code;
   displaying an incorrect vehicle message if the verification confirmation indicates that the rideshare vehicle does not correspond to the rideshare trip of the rider; and
   engaging a magnet lock between a rider device and the rideshare vehicle in response to verification of the rideshare, wherein the magnet lock establishes a proximity connection between the rider and the rideshare vehicle based on at least data collected by the rider device.

9. The method of claim 8, further comprising displaying media to the rider after verification of the rideshare.

10. The method of claim 9, wherein the media comprises a targeted advertisement based on at least profile data of the rider.

11. The method of claim 9, wherein the media comprises a targeted advertisement based on at least a route of the rideshare trip.

12. The method of claim 9, further comprising tracking a location of the rideshare vehicle during the rideshare trip, wherein the media comprises a targeted advertisement based on at least the tracked location.

13. The method of claim 1, further comprising:
   receiving rider information;
   determining at least one media item for the rider based on the received rider information; and
   transmitting the at least one media item to a vehicle device of the rideshare vehicle in response to receiving a confirmation that the rideshare trip has been verified.

14. The method of claim 1, wherein the proximity connection between the rider and the rideshare vehicle is based on at least positional data received from the rider device, nearfield wireless signaling, or sound collected by the rider device.

15. A method of providing rideshare verification to confirm whether a rider has entered an assigned rideshare vehicle comprising:
   assigning a verification code to a rideshare trip associated with the assigned rideshare vehicle;
   transmitting the verification code to a rider device to be entered into a vehicle device of the assigned rideshare vehicle associated with the rideshare trip to allow the rider to confirm that they have entered the rideshare vehicle of the rideshare trip;
   receiving rideshare data from the vehicle device to confirm that the rider has entered the assigned rideshare vehicle of the rideshare trip;
   determining the rideshare is verified based on the received rideshare data and the verification code, wherein the determination that the rideshare is verified confirms that the rider of the rideshare trip has entered the assigned rideshare vehicle of the rideshare trip;

engaging a magnet lock between the rider device and the assigned rideshare vehicle of the rideshare trip in response to verification of the rideshare, wherein the magnet lock establishes a proximity connection between the rider and the assigned rideshare vehicle of the rideshare trip based on at least data collected by the rider device;

tracking a location of the rider device and one or more of a driver device and the vehicle device while the magnet lock is engaged; and verifying the rideshare trip occurred based on the tracked location of the rider device and one or more of the driver device and the vehicle device.

16. The method of claim 15, wherein receiving rideshare data from the vehicle device comprises receiving an entered code, wherein determining the rideshare is verified comprises verifying the rideshare based on the verification code and the entered code.

17. The method of claim 16, further comprising transmitting rideshare trip information of the rideshare trip to a driver device of the rideshare vehicle in response to verification of the rideshare.

18. The method of claim 15, wherein the verification code comprises a string of alphanumeric characters.

19. The method of claim 15, further comprising:
providing terms and conditions to a driver device in response to verification of the rideshare; and
receiving acceptance of terms and conditions from the driver device.

* * * * *